(12) United States Patent
Wang et al.

(10) Patent No.: US 11,728,868 B2
(45) Date of Patent: Aug. 15, 2023

(54) APPARATUS AND METHOD FOR BEAM REPORTING, BEAM INDICATION AND SCHEDULING OF DATA TRANSMISSION DURING BEAM MANAGEMENT

(71) Applicant: Apple Inc., Cupertino, CA (US)

(72) Inventors: Guotong Wang, Beijing (CN); Yushu Zhang, Beijing (CN); Alexei Davydov, Nizhny Novgorod NIZ (RU)

(73) Assignee: Apple Inc., Cupertino, CA (US)

(*) Notice: Subject to any disclaimer, the term of this patent is extended or adjusted under 35 U.S.C. 154(b) by 357 days.

(21) Appl. No.: 16/637,181

(22) PCT Filed: Aug. 9, 2018

(86) PCT No.: PCT/CN2018/099672
§ 371 (c)(1),
(2) Date: Feb. 6, 2020

(87) PCT Pub. No.: WO2019/029631
PCT Pub. Date: Feb. 14, 2019

(65) Prior Publication Data
US 2020/0373988 A1    Nov. 26, 2020

(30) Foreign Application Priority Data

Aug. 11, 2017  (WO) ................ PCT/CN2017/097101
Aug. 17, 2017  (WO) ................ PCT/CN2017/097819

(51) Int. Cl.
*H04B 7/06* (2006.01)
*H04B 7/0404* (2017.01)
(Continued)

(52) U.S. Cl.
CPC ......... *H04B 7/0639* (2013.01); *H04B 7/0404* (2013.01); *H04B 7/0695* (2013.01);
(Continued)

(58) Field of Classification Search
CPC .. H04B 7/0404; H04B 7/0452; H04B 7/0632; H04B 7/0639; H04B 7/066;
(Continued)

(56) References Cited

U.S. PATENT DOCUMENTS

| | | | |
|---|---|---|---|
| 8,019,016 B1* | 9/2011 | Lee | H04L 25/0204 455/562.1 |
| 2015/0236772 A1* | 8/2015 | Hammarwall | H04W 24/10 370/329 |
| 2016/0072563 A1* | 3/2016 | Lee | H04B 7/0408 375/267 |

FOREIGN PATENT DOCUMENTS

| | | |
|---|---|---|
| CN | 105324944 | 2/2016 |
| CN | 105406908 | 3/2016 |

(Continued)

OTHER PUBLICATIONS

Catt, "Discussion on DL beam management," 3GPP TSG RAN WG1 Meeting #89, R1-1707475, Hangzhou, China, May 15-19, 2017, 10 pages.
EP Extended European Search Report and Written Opinion in European Appln. No. 18843343, dated Apr. 9, 2021, 10 pages.
Ericsson, "Onbeam grouping," 3GPP TSG-RAN WG1 #89ah-NR, R1-1711022, Qingdao, China, Jun. 27- 30, 2017, 15 pages.
(Continued)

*Primary Examiner* — Minh Trang T Nguyen
(74) *Attorney, Agent, or Firm* — Fish & Richardson P.C.

(57) ABSTRACT

Embodiments of the present disclosure describe apparatuses, methods and machine-readable storage medium for beam reporting, beam indication and scheduling of data transmission during beam management.

22 Claims, 14 Drawing Sheets

(51) Int. Cl.
  *H04B 7/08*      (2006.01)
  *H04L 5/00*      (2006.01)
  *H04B 7/0452*    (2017.01)

(52) U.S. Cl.
  CPC ........... *H04B 7/088* (2013.01); *H04L 5/0023* (2013.01); *H04B 7/0452* (2013.01)

(58) Field of Classification Search
  CPC ..... H04B 7/0695; H04B 7/088; H04L 1/0036; H04L 1/0091; H04L 1/06; H04L 5/0023; H04L 5/005; H04W 16/28
  See application file for complete search history.

(56) References Cited

FOREIGN PATENT DOCUMENTS

| | | |
|---|---|---|
| CN | 106412942 | 2/2017 |
| CN | 106537806 | 3/2017 |
| WO | WO 2017023231 | 2/2017 |

OTHER PUBLICATIONS

PCT International Preliminary Report on Patentability in International Appln. No. PCT/CN2018/099672, dated Feb. 11, 2020, 4 pages.
PCT International Search Report and Written Opinion in International Appln. No. PCT/CN2018/099672, dated Sep. 30, 2018, 6 pages.

* cited by examiner

_US 11,728,868 B2_

APPARATUS AND METHOD FOR BEAM REPORTING, BEAM INDICATION AND SCHEDULING OF DATA TRANSMISSION DURING BEAM MANAGEMENT

CROSS REFERENCES TO RELATED APPLICATIONS

This application is a National Stage application under U.S.C. § 371 of International Application No. PCT/CN2018/099672, entitled "APPARATUS AND METHOD FOR BEAM REPORTING, BEAM INDICATION AND SCHEDULING OF DATA TRANSMISSION DURING BEAM MANAGEMENT" filed on Aug. 9, 2018, and claims priority to International Application No. PCT/CN2017/097819, entitled "MATRIX BASED BEAM REPORTING AND BEAM INDICATION" and filed on Aug. 17, 2017, and international application No. PCT/CN2017/097101, entitled "DATA AND SYNCHRONIZATION SIGNAL BLOCK OR CHANNEL STATE REFERENCE SIGNAL TRANSMISSION" and filed on Aug. 11, 2017, all of which are hereby incorporated by reference in their entirety.

TECHNICAL FIELD

Embodiments of the present disclosure generally relate to the field of wireless communication, and more particularly to an apparatus and a method for beam reporting, beam indication and scheduling of data transmission during beam management.

BACKGROUND

In a communication system (e.g. a 5G NR system) utilizing Multi-User Multi-Input Multi-Output (MU-MIMO) techniques, beam forming is applied at both a Transmission Reception Point (TRP) side and a UE side. Beam management may be used to acquire and maintain TRP beams and UE beams for communication. For downlink beam management, at the UE side, the UE should report to the TRP which transmit (Tx) beams are good for communication according to beam measurement; while at the TRP side, the TRP should indicate to the UE which Tx beams are to be used for communication. The procedures of both beam reporting and beam indication may lead to a certain amount of overhead. It is desirable to reduce the overall overhead by designing an optimized scheme for beam reporting and beam indication.

On the other hand, during beam management, the TRP needs to periodically broadcast a beam management reference signal (BM-RS), for example, a Synchronization Signal and Physical Broadcasting Channel (SS/PBCH) block and a Channel State Information Reference Signal (CSI-RS). The UE needs to perform beam measurement based on the BM-RS to find an optimum beam pair including a Tx beam and a receive (Rx) beam for communication with the TRP. Generally, it may be allowable for the TRP to schedule data transmission on one or more symbols carrying the BM-RS. However, sometimes the data transmission over the symbols carrying the BM-RS might fail due to the change of the Tx beam or Rx beam for communication.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Figure 1:
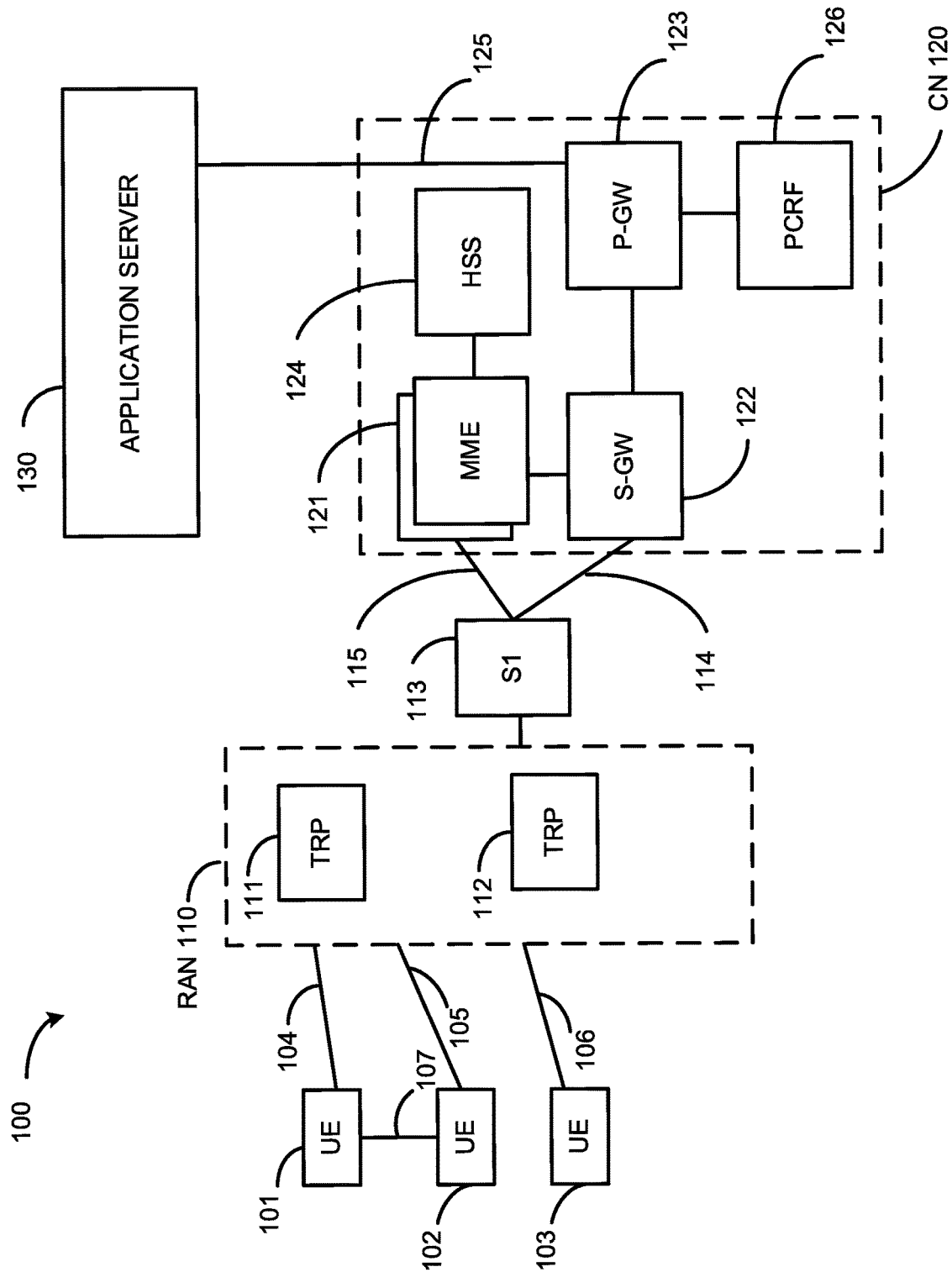
FIG. 1 shows an architecture of a system of a network in accordance with some embodiments of the disclosure.

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

In the 5G NR system, beam management may be performed at both the TRP side and the UE side to acquire and maintain optimal TRP and UE beams for communication. For downlink transmission, the beam management may include three procedures: P-1, P-2 and P-3. P-1 is to obtain the initial TRP Tx beam and UE Rx beam. P-2 is to enable the TRP Tx beam refinement and P-3 is to enable the UE Rx beam refinement.

For downlink beam management procedure P-1, the TRP needs to periodically broadcast a beam management reference signal (BM-RS) to UEs within a cell served by the TRP. At the UE side, the UE should report to the TRP which Tx beams are good for communication according to beam measurement on the BM-RS; while at the TRP side, the TRP should indicate to the UE which Tx beams are to be used for communication.

For beam reporting, the reporting content could include a Tx beam index or beam pair link (BPL) index and a metric of beam measurement. Here, the metric of beam measurement may be a Reference Signal Received Power (RSRP), a Block Error Ratio (BLER) or a Channel Quality Indicator (CQI) corresponding to a pair of currently measured Tx beam and Rx beam. Considering the large number of beams, an overhead for beam state reporting could be high. In order to reduce the overhead, a scheme of group based beam reporting has been proposed which has two solutions.

The first solution may be referred to as Rx beam set based reporting, in which different Tx beams reported for a same Rx beam set can be simultaneously received by the UE. The second solution may be referred to as Rx antenna group/antenna panel based reporting, in which different Tx beams reported for different panels can be simultaneously received by the UE.

For the first solution, it can reduce the overhead for beam indication. But it put some restriction on the network side scheduling. The network side has to follow the combination of Tx beams reported by the UE. Thus the first solution requires a lot of overhead for reporting because a lot of groups should be constructed if the same flexibility is required as the second solution. Also, the first solution requires additional information from the network side on which Tx beams could be sent simultaneously.

For the second solution, it is simple and more flexible because the reporting is based on individual UE antenna panels. But it may require more overhead for beam indication compared with the first solution.

It may be desirable to propose a new scheme for group based beam reporting and beam indication, so as to reduce the overall overhead for beam reporting and beam indication.

FIG. 1 illustrates an architecture of a system 100 of a network in accordance with some embodiments. The system 100 is shown to include a user equipment (UE) 101, a UE 102, and a UE 103. The UEs 101, 102 and 103 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101, 102 and 103 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101, 102 and 103 may be configured to connect, e.g., communicatively couple, with a radio access network (RAN) 110—the RAN 110 may be, for example, an Evolved Universal Mobile Telecommunications System (UMTS) Terrestrial Radio Access Network (EUTRAN), a NextGen RAN (NG RAN), or some other type of RAN. The UEs 101, 102 and 103 utilize connections 104, 105 and 106, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 107. The ProSe interface 107 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The RAN 110 can include one or more Transmission Reception Points (TRPs) 111 and 112 that enable the connections 104, 105 and 106. Any of the TRPs 111 and 112 can be a part of a base station (BS), a NodeB, an evolved NodeB (eNB), a next Generation NodeB (gNB), a RAN node, and so forth, and can comprise ground stations (e.g., terrestrial access points) or satellite stations providing coverage within a geographic area (e.g., a cell). The TRPs 111 and 112 can supports the MU-MIMO operation.

Any of the TRPs 111 and 112 can terminate the air interface protocol and can be the first point of contact for the UEs 101, 102 and 103. In some embodiments, any of the TRPs 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101, 102 and 103 can be configured to communicate using Orthogonal Frequency-Division Multiplexing (OFDM) communication signals with each other or with any of the TRPs 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the TRPs 111 and 112 to the UEs 101, 102 and 103, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101, 102 and 103. The physical downlink control channel (PDCCH) may carry information about the transport format and resource allocations related to the PDSCH channel, among other things. It may also inform the UEs 101, 102 and 103 about the transport format, resource allocation, and H-ARQ (Hybrid Automatic Repeat Request) information related to the uplink shared channel. Typically, downlink scheduling (assigning control and shared channel resource blocks to the UEs within a cell) may be performed at any of the TRPs 111 and 112 based on channel quality information fed back from any of the UEs 101, 102 and 103. The downlink resource assignment information may be sent on the PDCCH used for (e.g., assigned to) each of the UEs 101, 102 and 103.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LIE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the TRPs 111 and 112 and the serving gateway (S-GW) 122, and the S1-mobility management entity (MME) interface 115, which is a signaling interface between the TRPs 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-TRP handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101, 102 and 103 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of system 100 may perform one or more functions described as being performed by another one or more of the devices of system 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
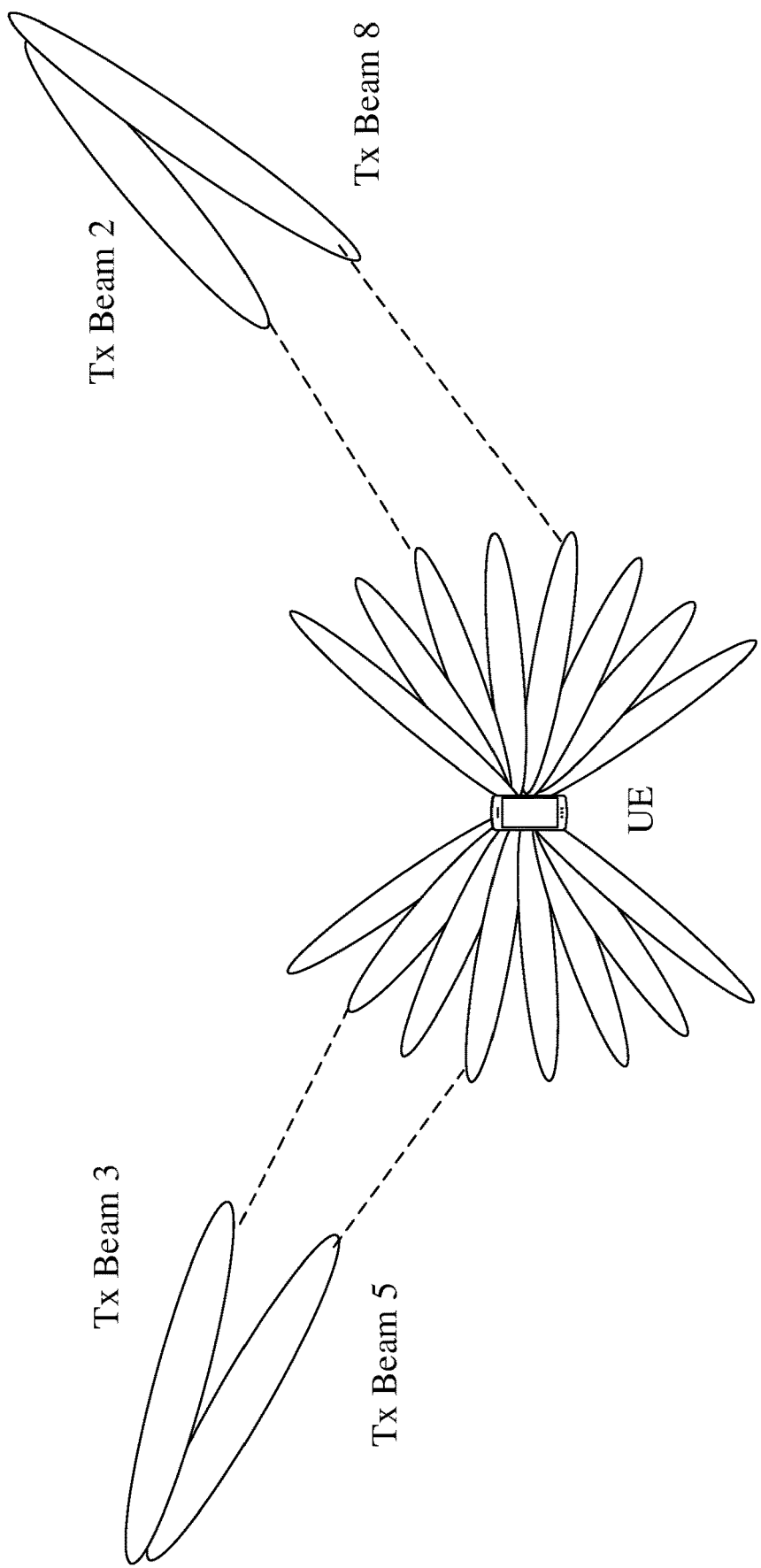
FIG. 2 shows an example scenario of beamforming at a UE side according to some embodiments of the disclosure.

As described above, in the 5G NR system such as the system of FIG. 1, the scheme of group based beam reporting includes two solutions: the Rx beam set based reporting and the antenna panel based reporting. FIG. 2 shows an example scenario of beamforming at a UE side according to some embodiments of the disclosure. The two solutions of group based beam reporting will be demonstrated with reference to the example scenario in FIG. 2.

In FIG. 2, the UE has two antenna panels. On the first panel, the best two Tx beams observed are Tx beam 3 and Tx beam 5. On the second panel, the best two Tx beams observed are Tx beam 2 and Tx beam 8.

With the antenna panel based reporting, at the UE side, the UE will report two groups each of which corresponds to one antenna panel. That is, the first group is (Tx beam 3, Tx beam 5) and the second group is (Tx beam 2, Tx beam 8). In this way, the reporting overhead would include the overhead of a Tx beam index (also called a "Tx beam ID") and a group index (also called a "group ID"). The group ID just occupies 1 bit since there are only two groups corresponding to two antenna panels. On the other hand, at the TRP side, after receiving the report from the UE, the TRP should indicate a group of Tx beams which it decides to use for communication with the UE. For example, if the TRP selects the Tx beam 3 and Tx beam 8 for simultaneous transmission, the TRP will indicate the Tx beam ID together with the group ID for each Tx beam. Since two Tx beams are reported from the same group, the Tx beam ID occupies 1 bit. Then the total overhead for beam indication will be (1+1)*2=4 bits.

With the Rx beam set based reporting, the UE should construct four groups if the same flexibility is desired as the antenna panel based reporting. The different Tx beams in each group are observed by different panels to ensure that the different Tx beams can be simultaneously received by the UE. According to the example scenario of FIG. 2, the UE may construct four groups of Tx beams: (Tx beam 3, Tx beam 2), (Tx beam 3, Tx beam 8), (Tx beam 5, Tx beam 2), and (Tx beam 5, Tx beam 8). Thus the group ID for reporting will occupy 2 bits. On the other hand, when performing beam indication, the TRP just needs to indicate the group ID which is 2 bits.

Thus in comparison, from the overhead perspective, more beam reporting overhead at the UE side may be required when using the solution of Rx beam set based reporting, while more beam indication overhead at the TRP side may be required when using the solution of antenna panel based reporting.

In order to address the overhead issue and meanwhile maintain the flexibility, a solution of Tx beam matrix based reporting is proposed in the present disclosure. In the proposed solution, the UE may report groups of Tx beams based on UE antenna panels and each group contains Tx beams observed per panel. That is, a matrix of Tx beams is reported to the TRP. In the Tx beam matrix, elements in each column correspond to Tx beam candidates observed by a respective antenna panel of the UE. These Tx beam candidates are determined to be good for communication based on beam measurement at the UE.

When the TRP performs beam indication, it can reconstruct the groups of Tx beams that can be sent simultaneously, according to the Tx beam matrix reported from the UE and a reconstruction rule. For example, it can pick one Tx beam reported from each panel, and use the group index for beam indication. When reconstructing the groups, the TRP may predefine the reconstruction rule and notify the UE about it, so that both the TRP side and the UE side can follow the same rule and the TRP can indicate the UE of a group of selected Tx beams just using a respective group index. In this way the beam indication overhead could be reduced. Meanwhile, the flexibility of the antenna panel based reporting can be maintained for beam reporting.

Figure 3:
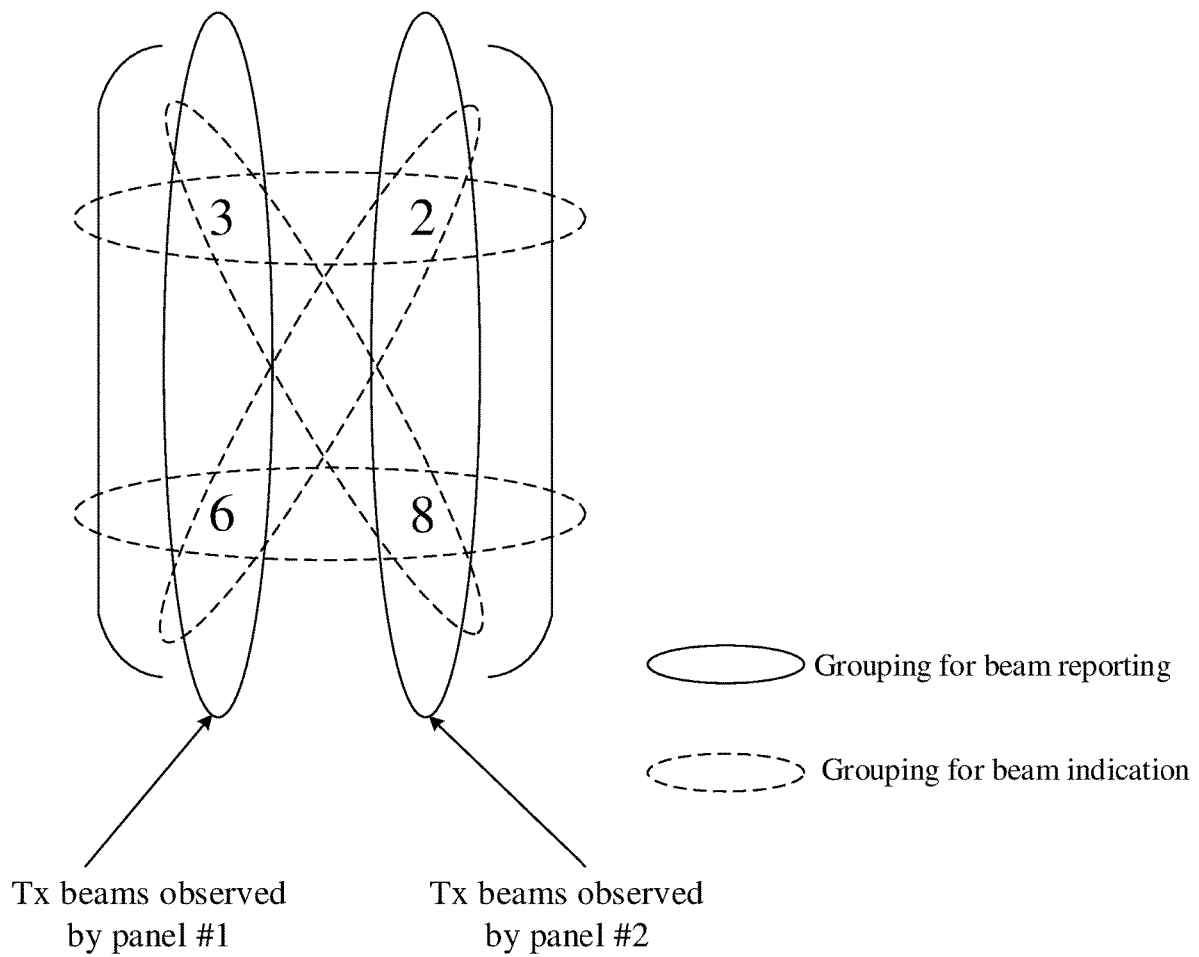
FIG. 3 shows an example of a reported Tx beam matrix in accordance with some embodiments of the present disclosure.

Considering the example scenario in FIG. 2, the Tx beam matrix is shown in FIG. 3.

When performing the beam reporting, the above described second solution is used for group based beam reporting. In particular, the UE should report good Tx beams on UE antenna panel basis. All the reported Tx beams from all the UE antenna panels compose a Tx beam matrix. Each column of the matrix includes elements corresponding to Tx beam candidates observed by a respective antenna panel of the UE. Different columns of the matrix corresponds to Tx beam candidates observed by different UE antenna panels. For sake of conciseness, the elements corresponding to Tx beam candidates in the Tx beam matrix will be simply referred to as Tx beam candidates or Tx beams in the Tx beam matrix hereinafter.

After receiving the reported Tx beam matrix, the TRP should reconstruct the groups of Tx beams according to the reported Tx beam matrix and indicate a group of Tx beams selected for communication between the TRP and the UE. The elements in one group are from different columns of the matrix to make sure that the Tx beams in one group can be simultaneously received by different antenna panels at the UE side. Also, the reconstruction rule predefined by the TRP should be known to both the UE and the gNB to facilitate the beam indication. For example, as shown by the dashed ellipses, the TRP may pick the elements in the first row as the first group, the downward diagonal elements as the second group, the upward diagonal elements as the third group, and the elements in the last row as the fourth group. Thus as illustrated in FIG. 3, the Tx beam groups after reconstruction will include the groups of (Tx beam 3, Tx beam 2), (Tx beam 3, Tx beam 8), (Tx beam 5, Tx beam 2), and (Tx beam 5, Tx beam 8). When performing beam indication, the TRP could indicate the UE just using the group index after reconstruction. In this case, since there are four groups reconstructed by the TRP, the beam indication overhead is just two bits.

In order to further reduce the overhead, when reporting Tx beams, the elements in each column, i.e. the reported Tx beams based on each panel, could be sorted in a descending or ascending order of a metric of beam measurement. Here, the metric of beam measurement may be a Reference Signal Received Power (RSRP), a Block Error Ratio (BLER) or a Channel Quality Indicator (CQI) corresponding to a pair of currently measured Tx beam and Rx beam. Thus the first row or the last row will be the best Tx beams observed by each panel at the UE side.

At the TRP side, the best Tx beams may also probably selected by the TRP for transmission. So when performing beam indication, the TRP could indicate whether the combination of the best Tx beams is to be used with a one-bit flag. If yes, it means that the TRP will directly select the combination of the best Tx beams for transmission. Thus the TRP will not reconstruct groups of Tx beam candidates any more. In other words, the TRP can define the reconstruction rule as no reconstruction is needed. In this case, just one bit is used for beam indication. On the other hand, the TRP may indicate that it will not select the combination of the best Tx beams although the UE determines these Tx beams as the best Tx beams based on beam measurement. The TRP will determine which Tx beams are to be used according to the Tx beam matrix reported from the UE. So the TRP may first reconstruct groups of Tx beam candidates from the Tx beam matrix and then indicate a group of selected Tx beams with a group index as illustrated above.

Figure 4:
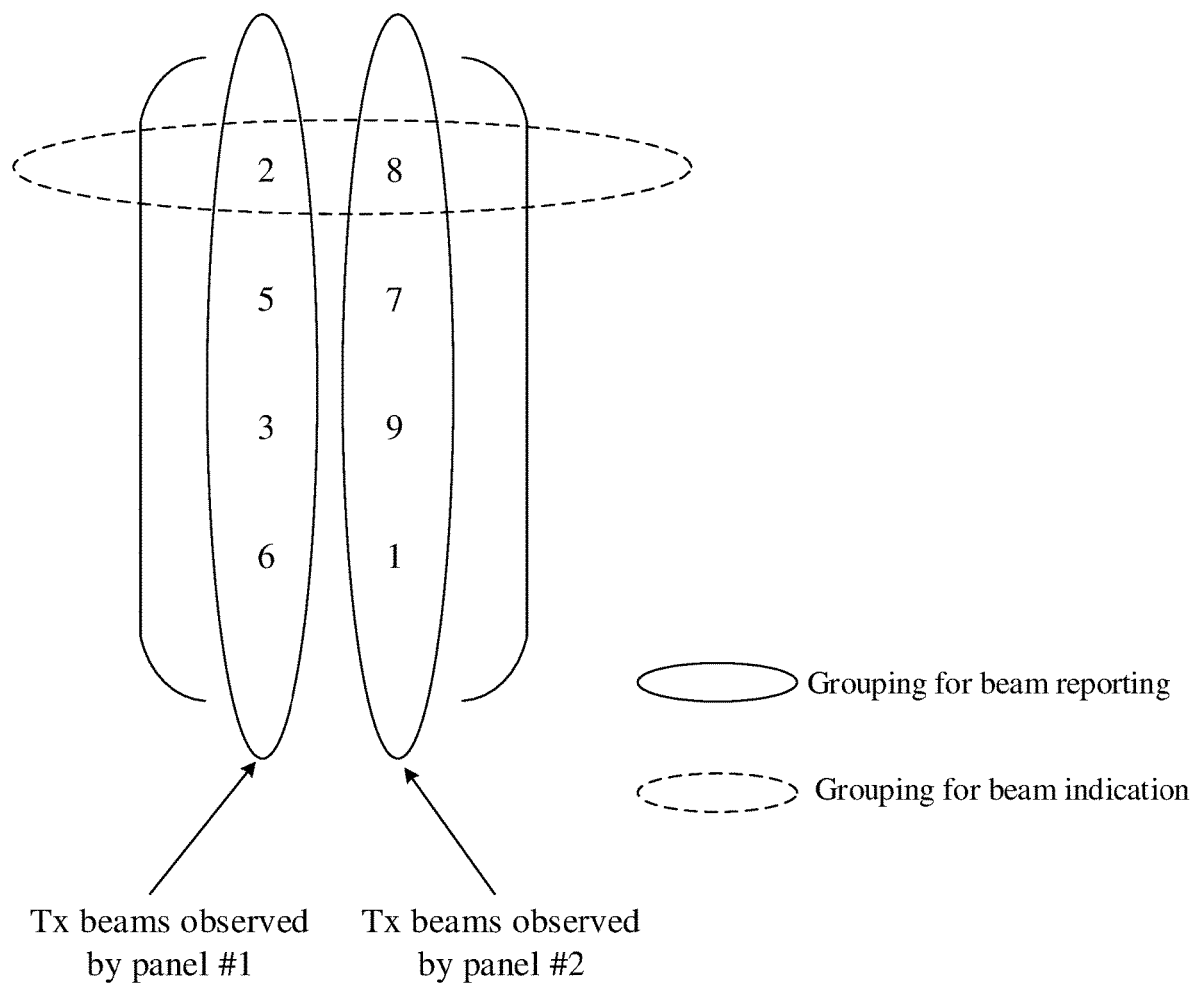
FIG. 4 shows another example of a reported Tx beam matrix in accordance with some embodiments of the present disclosure.

FIG. 4 shows an example Tx beam matrix reported from the UE, in which the reported Tx beams based on each antenna panel are sorted in a desceding or ascending order of a metric of beam measurement, i.e., a metric representing beam quality, e.g. RSRP. For example, as shown in FIG. 4, the first row of elements correspond to the best Tx beams 2 and 8 as determined by the UE. For beam indication, 1 bit flag is used to indicate whether the combination of the best Tx beams is to be used or not. If yes, then just one bit is used for beam indication. Otherwise, the TRP may indicate a group of selected Tx beams with a group index after reconstruction as illustrated above.

Additionally, in order to further reduce the overhead for beam indication, there could be a subset of Tx beams predefined at the TRP side from the reported Tx beam matrix for beam indication. The size and construction of the subset are known to both the UE and the TRP. For example, the first two rows of the matrix may compose the subset or all the rows of the matrix may compose the subset. When performing beam indication, groups should be reconstructed based on the subset. Thus the overhead for beam indication could be reduced. The TRP could use a one-bit flag to indicate whether to select a group of Tx beams for transmission from the groups within the subset. If yes, then the TRP may indicate a group of Tx beams from the groups of Tx beam candidates reconstructed based on the subset. Otherwise, the TRP may indicate a group of Tx beams from the groups of Tx beam candidates reconstructed based on the reported Tx beam matrix.

In the above embodiments as illustrated, the reporting of the Tx beam matrix is based on individual antenna panels of the UE. In an alternative embodiment, the reporting of the Tx beam matrix could also be based on individual Rx beam sets at the UE side. Particularly, the UE reports several groups of Tx beams. Within one group, different elements correspond to Tx beams observed by different antenna panels of the UE. All the reported Tx beams compose the Tx beam matrix. In the matrix, each column of elements should correspond to Tx beams observed by a same UE antenna panel, i.e. each column corresponds to one UE antenna panel. Meanwhile, each row of the matrix should correspond to a group of Tx beams observed by a respective Rx beam set.

When reporting the Tx beams, the UE should report the grouped Tx beams on UE antenna panel basis. That is, each column of elements in the matrix have a same group ID, and each row of elements in the matrix correspond to the Tx beams observed by a respective Rx beam set. When performing beam indication, the groups of Tx beams should be indicated on the row of matrix basis, i.e., the rows of the matrix (corresponding to different Rx beam sets) compose a subset for beam indication.

The TRP could use a one-bit flag to indicate whether to select a group of Tx beams for transmission from the groups within the subset (i.e. the rows of elements corresponding to Tx beams observed by respective Rx beam sets). If the one-bit flag indicates that the TRP is to indicate a group of selected Tx beams based on a respective Rx beam set, then the TRP could indicate the group of selected Tx beams just using a respective row index. In this case, it can be understood that the reconstruction rule can be predefined by the TRP as picking each row of the matrix as a group of Tx beam candidates. In this way, the overhead for beam indication can be reduced. Otherwise, the TRP may indicate a group of Tx beams from the groups of Tx beam candidates reconstructed based on the reported Tx beam matrix and a predefined reconstruction rule as illustrated above.

Figure 5:
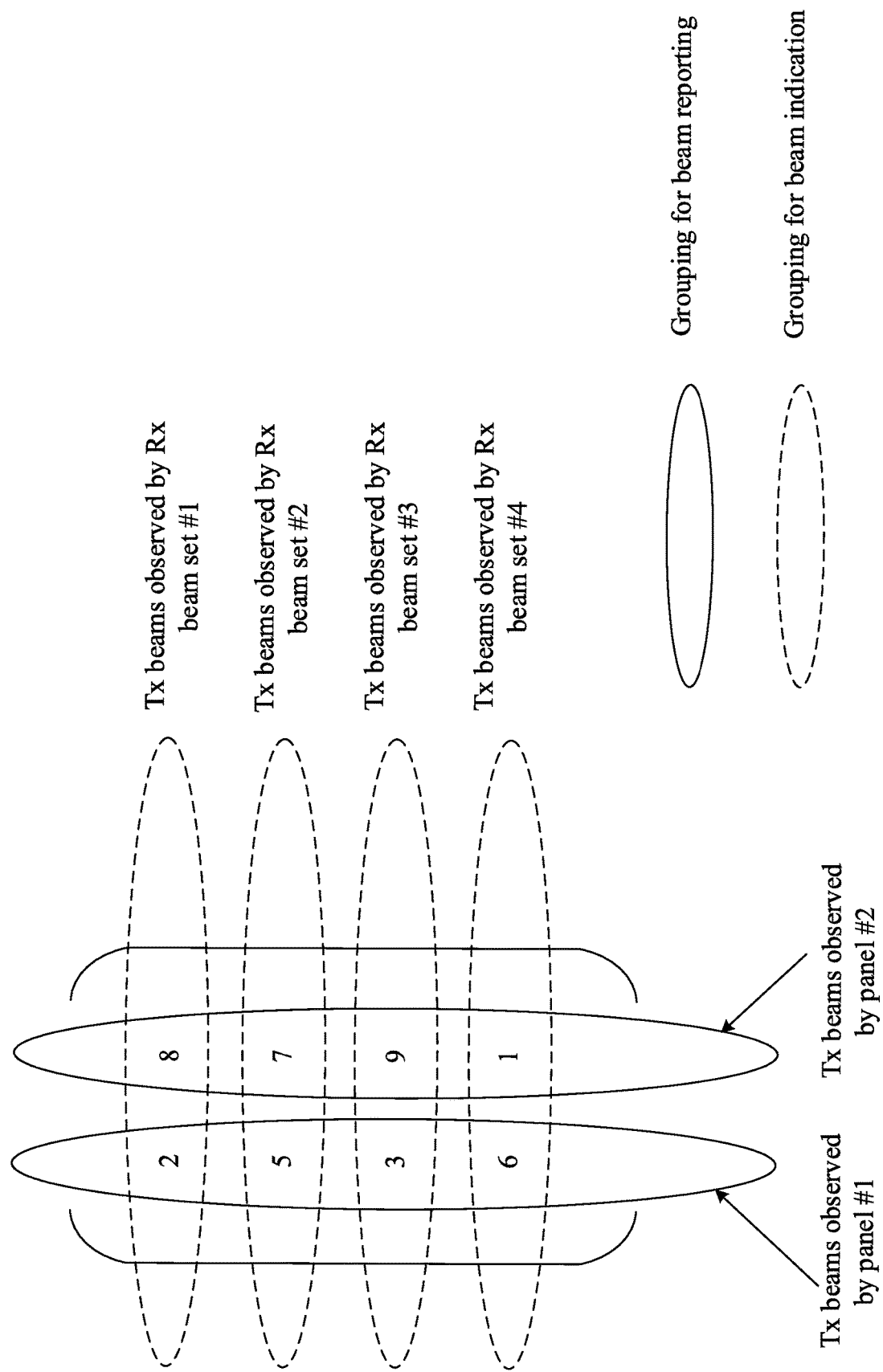
FIG. 5 shows another example of a reported Tx beam matrix in accordance with some embodiments of the present disclosure.

FIG. 5 shows an example Tx beam matrix reported from the UE according to some embodiments of the present disclosure. As illustrated in FIG. 5, the Tx beams 2, 5, 3 and 6 observed by the antenna panel #1 are reported in the first column of the matrix, and the Tx beams 8, 7, 9 and 1 observed by the antenna panel #2 are reported in the second column of the matrix. From the perspective of the rows of the matrix, the Tx beams 2 and 8 observed by the Rx beam set #1 are reported in the first row of the matrix, the Tx beams 5 and 7 observed by the Rx beam set #2 are reported in the second row of the matrix, the Tx beams 3 and 9 observed by the Rx beam set #3 are reported in the third row of the matrix, and the Tx beams 6 and 1 observed by the Rx beam set #4 are reported in the fourth row of the matrix.

When perform beam reporting, the grouping of the Tx beams may be based on the columns of the matrix, i.e. on UE antenna panel basis. The group ID should attached to the Tx beams. Thus the reporting overhead could be reduced compared with the Rx beam set based reporting since less groups are needed. Furthermore, additional information could be delivered to the TRP side about the UE receiving capability, i.e. which Tx beams could not be received simultaneously by the UE. The Tx beams observed by a same Rx beam set could be received simultaneously by the UE.

When perform beam indication, the grouping of the Tx beams may be based on the rows of the matrix, i.e. on UE Rx beam set basis. The rows of the matrix compose a subset of possible combinations of Tx beams which are preferred to be used by the UE. The TRP could use a one-bit flag to indicate whether to select a row of Tx beams for transmission from the subset. If yes, then the TRP could indicate a row of selected Tx beams just using a respective row index. Otherwise, the TRP may indicate a group of Tx beams with a respective group index from the groups of Tx beam candidates reconstructed based on the reported Tx beam matrix.

Taking the Tx beam matrix of FIG. 5 as an example, four rows of Tx beams observed by four respective Rx beam sets are indicated by four dashed ellipses. The TRP uses the one-bit flag to indicate to the UE that it will select a row of Tx beams for transmission from the subset including the four rows of Tx beams. Then the TRP may indicate a row of Tx beams (e.g. Tx beams 5 and 7) as a group of selected Tx beams with a row index. In this example, the overhead for indicating the row index is 2 bits since there are four rows of Tx beams reported from the UE. Thus the total overhead for beam indication is a sum of the overhead of the one-bit flag and the overhead for indicating the row index, i.e. (1+2)=3 bits.

In addition, the TRP could use a one-bit flag to indicate whether the beam indication is based on Rx beam sets or not. If yes, it means the indicated group of Tx beams is based on one of the reported Rx beam sets, i.e. it is one row of the reported matrix. If not, the TRP will not use the Rx beam set based grouping for beam indication. Instead, it will use the conventional beam indication, i.e. Tx beam index plus group index. The group index is used to identify one of the reported groups based on UE antenna panels.

Figure 6A:
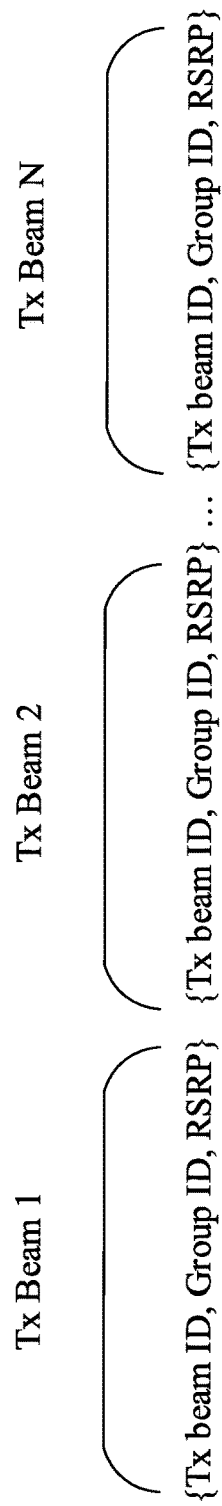
FIG. 6a and FIG. 6b show examples of beam reporting format in accordance with some embodiments of the present disclosure.

Regarding the reporting format, there could be two example solutions. One example reporting format is shown in FIG. 6a, in which for each of the Tx beam candidates, a combination of a Tx beam index (or a beam pair link index), a group index and a metric of the beam measurement (e.g. RSRP or BLER or CQI) corresponding to the Tx beam candidate are reported to the TRP. In this example, when reporting the Tx beams, a group index could be attached to each Tx beam, and accordingly, the Tx beams with a same group index belong to a same group.

Figure 6B:
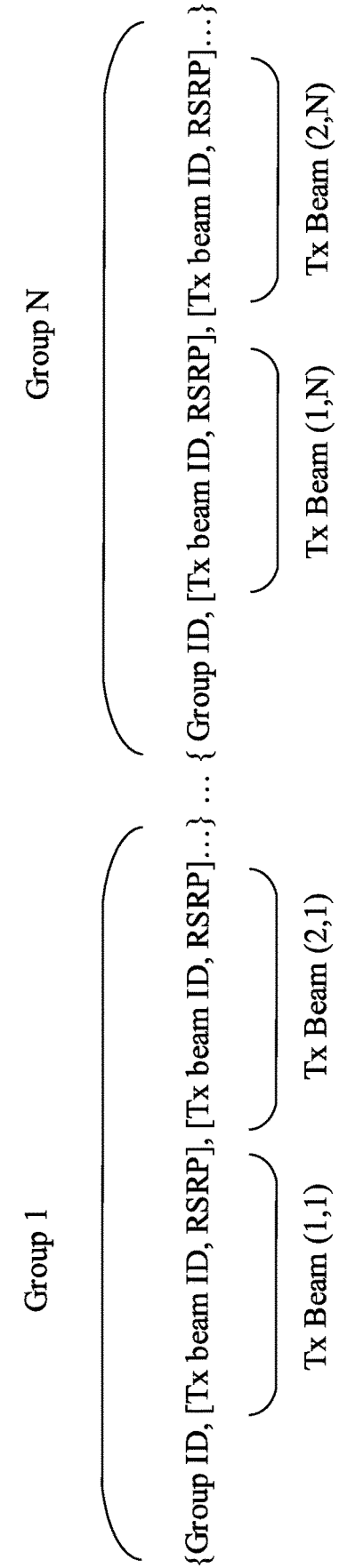

The other example reporting format is shown in FIG. 6b, in which for all of the Tx beams candidates within a group, a group index is reported once to the TRP, and a combination of a Tx beam index (or a beam pair link index) and a metric of the beam measurement (e.g. RSRP or BLER or CQI) corresponding to each Tx beam candidate are reported to the TRP. In this example, for the Tx beams within one group, only one group index is attached to the group. Thus the overhead for the group index could be reduced, and the Tx beams at the same position within each group form one group based on one Rx beam set. For example, in FIG. 6b, the Tx beams (1, 1), (1, 2) . . . (1, N) form one group based on one Rx beam set.

Furthermore, whether the matrix based beam reporting and beam indication is enabled could be configured by the network. The configuration could be through higher layer signaling or Downlink Control Information (DCI). Alternatively, the network could further separately configure beam reporting with grouping on UE antenna panel basis and beam indication with grouping on UE Rx beam set basis. The configuration could be also through higher layer signaling or DCI.

Alternatively, the UE could request whether to use the matrix based beam reporting and beam indication. It could be indicated in the UE capability. The UE could also indicate separately for capabilities of beam reporting with grouping on UE antenna panel basis and beam indication with grouping on UE Rx beam set basis. Then whether to use the corresponding grouping may be determined by the network.

Figure 7:
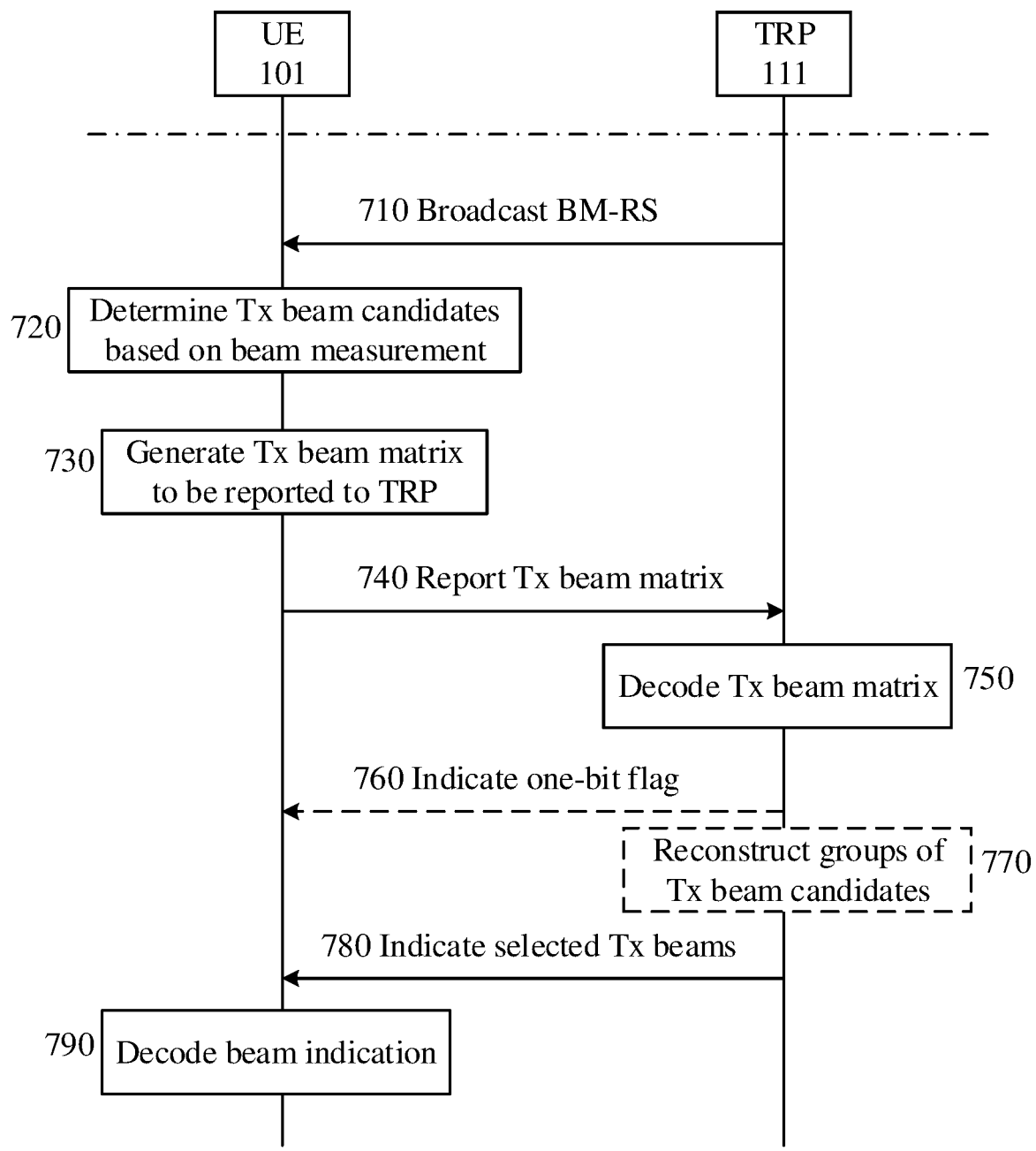
FIG. 7 shows a flow chart of a part of beam management procedure involving Tx beam matrix based beam reporting and beam indication between the TRP side and the UE side in accordance with some embodiments of the present disclosure.

FIG. 7 shows a flow chart of a part of beam management procedure involving the Tx beam matrix based beam reporting and beam indication between the TRP side and the UE side according to some embodiments of the present disclosure.

At 710, the TRP 111 may periodically broadcast a beam management reference signal (referred to as BM-RS, e.g. a CSI-RS or a SS/PBCH block) to UEs (e.g. the UE 101) within the coverage of the TRP 11. At 720, the UE 101 may determine Tx beam candidates good for communication by performing beam measurement based on the BM-RS.

At 730, the UE 101 may generate a Tx beam matrix to be reported to the TRP 111. The UE 101 is configured with one or more antenna panels for receiving Tx beams from the TRP 111. As described above, each column of the Tx beam matrix may include elements corresponding to the Tx beam candidates determined based on beam measurement and observed by a respective antenna panel of the one or more antenna panels of the UE 101.

Additionally or alternatively, the elements in each column, i.e. the Tx beams candidates observed by each panel, could be sorted in a descending or ascending order of a metric of beam measurement, so that a first row or a last row of the Tx beam matrix includes best Tx beams observed by each antenna panel of the UE 101.

Additionally or alternatively, the UE 101 may specify one or more Rx beam sets, each of which corresponds to a group of Tx beams that can be simultaneously received at the UE 101. Each row of the Tx beam matrix may include Tx beam candidates corresponding to a respective Rx beam set of the one or more Rx beam sets specified by the UE 101.

At 740, the UE 101 may report the generated Tx beam matrix to the TRP 111. At 750, The TRP 111 may decode the Tx beam matrix reported from the UE 101. At 770, the TRP 111 may reconstruct groups of Tx beams that can be sent simultaneously, according to the Tx beam matrix and a predefined reconstruction rule known to both the TRP and the UE. At 780, the TRP 110 may indicate to the UE about a group of selected Tx beams using a respective group index.

Alternatively, in case that the Tx beam candidates in each column of the Tx beam matrix are sorted in a descending or ascending order of a metric of the beam measurement, at 760, the TRP 111 may indicate a one-bit flag to the UE for indicating whether a combination of the best Tx beams in the first row or the last row of the Tx beam matrix are to be used by the TRP or not. If the combination of the best Tx beams are to be used by the TRP as indicated by the one-bit flag, the reconstruction at 770 may be ignored and the overhead for beam indication will be just 1 bit.

Alternatively, in case that each row of the Tx beam matrix includes Tx beam candidates corresponding to a respective Rx beam set specified by the UE 101, at 760, the TRP 111 may indicate a one-bit flag to the UE 101 for indicating whether to select a row of Tx beams for transmission from a subset including one or more rows of the Tx beam matrix. If the one-bit flag indicates a row of Tx beams are to be selected from the subset, then at 780, the TRP 111 could indicate a row of selected Tx beams using a respective row index. Otherwise, the TRP 111 may first reconstruct the groups of Tx beam candidates from the reported Tx beam matrix at 770 and indicate a group of Tx beams with a respective group index from the groups of reconstructed Tx beam candidates at 780.

Alternatively, at 760, the TRP 111 may indicate a one-bit flag to the UE 101 for indicating whether to select a group of Tx beams for transmission from a subset having a predefined size and construction known to both the TRP 111 and the UE 101. If the one-bit flag indicates the group of Tx beams for transmission are to be selected from the subset, then at 770, the TRP 111 may reconstruct the groups of Tx beam candidates from the subset. Otherwise, at 770, the TRP 111 may reconstruct the groups of Tx beam candidates from the reported Tx beam matrix. Then at 780, the TRP 111 may indicate the group of selected Tx beams with a respective group index.

At 790, the UE 101 may decode an indication received from the TRP 111 to determine a group of selected Tx beams to be used by the TRP 111 to communicate with the UE 101. Here, the indication may include a group index indicating the group of selected Tx beams among a number of groups of Tx beam candidates reconstructed by the TRP 111 from the Tx beam matrix based on a predefined reconstruction rule known to both the TRP 111 and the UE 101. Additionally or alternatively, the indication may include a one-bit flag for indicating whether a combination of the best Tx beams in the first row or the last row of the Tx beam matrix are to be used by the TRP 111 or not, a one-bit flag for indicating whether the TRP 111 will select a row of Tx beams for transmission from a subset including one or more rows of the Tx beam matrix, or a one-bit flag for indicating whether the TRP 111 will select a group of Tx beams for transmission from a subset having a predefined size and construction known to both the TRP 111 and the UE 101.

With the Tx beam matrix based beam reporting and beam indication according to the embodiments of the present disclosure, the overhead for beam indication can be reduced and meanwhile the flexibility for beam reporting can be maintained the same as the UE antenna panel based beam reporting.

During beam management, the TRP needs to periodically broadcast a beam management reference signal (BM-RS), for example, a SS/PBCH block and a CSI-RS. Accordingly, the UE will perform beam measurement based on the BM-RS to find an optimum beam pair including a Tx beam and a Rx beam for communication with the TRP. Generally, it may be allowable for the TRP to schedule data transmission on one or more symbols carrying the BM-RS. However, sometimes the data transmission over the symbols carrying the BM-RS might fail due to the change of the Tx beam or Rx beam for communication.

Figure 8:
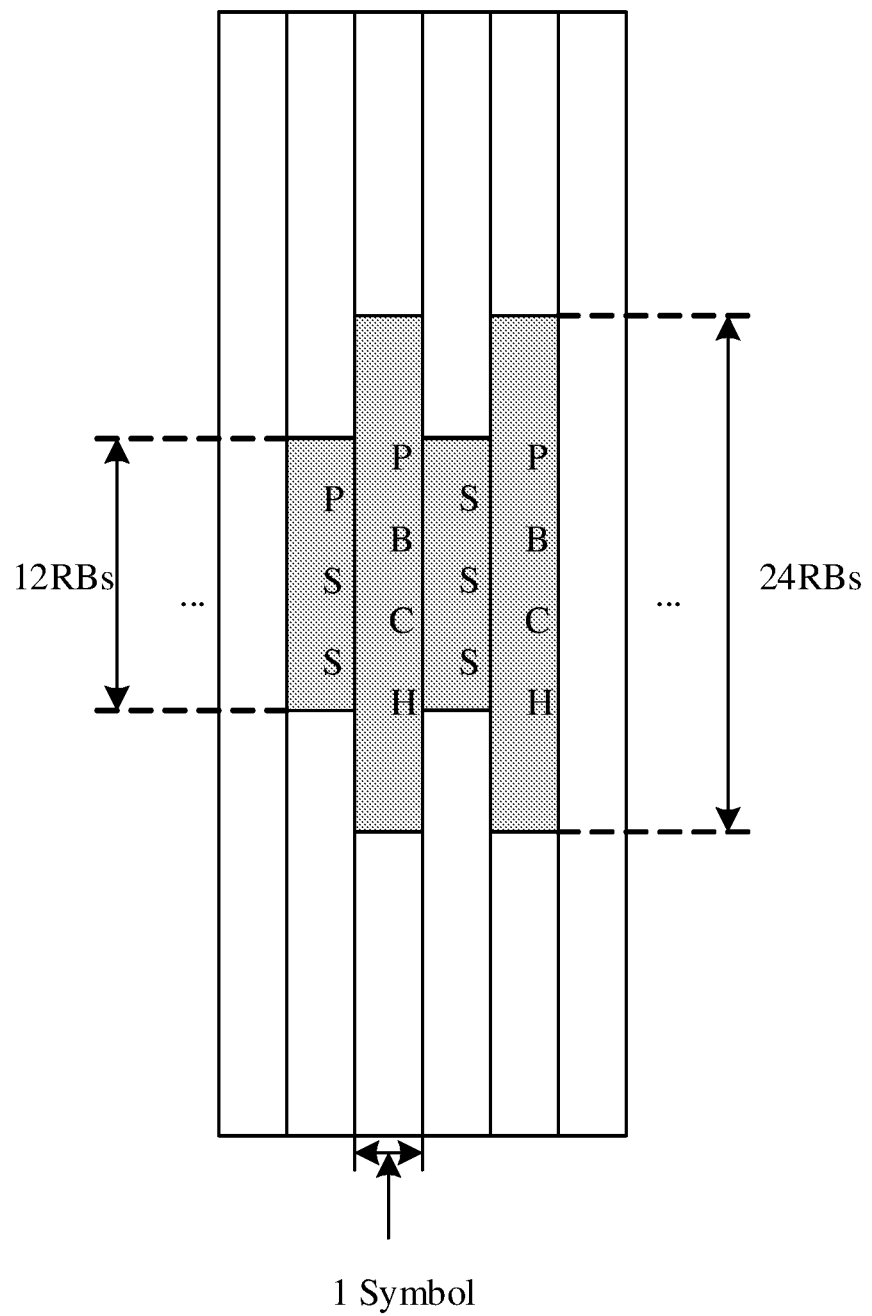
FIG. 8 shows an example structure of a SS/PBCH block for beam measurement in accordance with some embodiments of the present disclosure.

For example, in a 5G NR system, a SS/PBCH block can be used as the BM-RS for beam management, which is composed of a Primary Synchronization Signal (PSS), Secondary Synchronization Signal (SSS) and Physical Broadcasting Channel (PBCH). As shown in FIG. 8, for a SS/PBCH block, the PSS and the SSS may occupy 12 Resource Blocks (RBs) and the PBCH may occupy 24 RBs, and the SS/PBCH block may be carried on more than one symbol.

The SS/PBCH block could be transmitted in a communication system utilizing MU-MIMO techniques. During beam management in the communication system, the SS/PBCH block can be used as a reference signal for measurement of a channel quality of a transmission link including a pair of currently serving Tx beam and Rx beam. Normally, it may be allowable to schedule data transmission on one or more symbols carrying the SS/PBCH block. However, when the UE performs beam measurement based on the SS/PBCH block, it may use a different Rx beam if the channel quality associated with the pair of currently serving Tx beam and Rx beam. In this case, since the UE is going to search a new link including a new Rx beam different from the currently serving Rx beam and accordingly perform measurement on the SS/PBCH block with the new Rx beam, the data transmission over the symbols or slots carrying the SS/PBCH block might fail.

According to some embodiments of the present disclosure, the UE may explicitly indicate the TRP not to schedule data transmission on one or more symbols carrying the SS/PBCH block, when the UE determines that it needs to measure on the SS/PBCH block with a different Rx beam so as to search a new link including the currently serving Tx beam and the different Rx beam. The indication could be transmitted to the TRP over PUCCH or PUSCH. After receiving the indication, the TRP will not schedule data transmission over the symbols carrying the SS/PBCH block.

Figure 9:
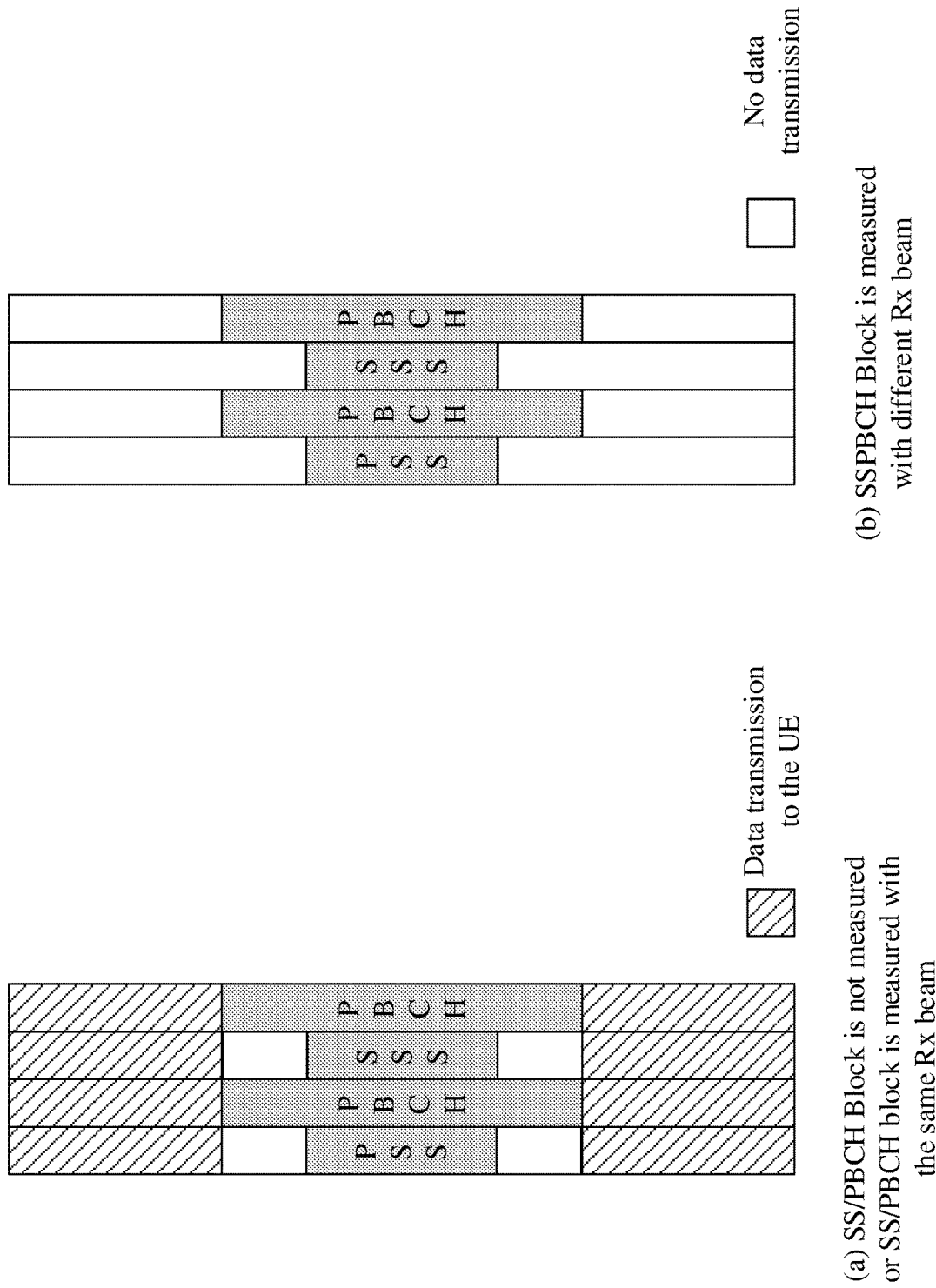
FIG. 9 shows example schedules of SS/PBCH block and data transmission in accordance with some embodiments of the present disclosure.

FIG. 9 shows example schedules of SS/PBCH block and data transmission according to some embodiments of the present disclosure. As illustrated in FIG. 9, when the UE does not perform measurement on the SS/PBCH block or the UE performs measurement on the SS/PBCH block with the currently serving Rx beam, the data transmission can be multiplexed on the symbols carrying the SS/PBCH block. However, when the UE is going to perform measurement on the SS/PBCH block with a different Rx beam, the data transmission should not be scheduled on the symbols carrying the SS/PBCH block.

In order to determine whether measurement with a different Rx beam is needed, the UE could compare a measured channel quality of a current link including the currently serving Tx beam and the currently serving Rx beam with a certain threshold. For example, the channel quality can be characterized by a Reference Signal Received Power (RSRP), a Block Error Ratio (BLER) or a Channel Quality Indicator (CQI) as measured based on the SS/PBCH block.

According to some embodiments, if the measured channel quality of the current link is higher than or equal to a first threshold T1, it means that the current link is good enough and thus the measurement with a different Rx beam is not necessary. If the measured channel quality of the current link is lower than the first threshold T1 and higher than a second threshold T2, it means that the current link is not very good, and the UE may perform measurement on the SS/PBCH block with a different Rx beam in order to find a better link. If the measured channel quality of the current link is lower than or equal to the second threshold T2, it means that the quality of current link is very bad and a beam failure recovery process for the UE to perform a completely new beam management procedure should be triggered. Herein, the thresholds T1 and T2 could be predefined or configured by higher layer signaling and T1 is greater than T2.

If the UE finds the channel quality of the current link is better than the first threshold T1, it may indicate that the UE is not necessary to perform measurement to find different beams on a same antenna panel, which means that the measurement interval could be prolonged. In other words, some measurements on periodic SS/PBCH blocks could be ignored. Thus in some embodiments, when the measured channel quality of the current link is higher than or equal to the first threshold T1, the UE may suspend the measurement of the channel quality for a predefined time period and the TRP could transmit data on one or more symbols carrying the SS/PBCH block.

If the measured channel quality of the current link is lower than the first threshold T1 and higher than the second threshold T2, the UE may determine to measure on the SS/PBCH block with a different Rx beam and indicate the TRP not to schedule data transmission on one or more symbols carrying the SS/PBCH block.

Alternatively, the indication about whether a different Rx beam should be used for measurement on the SS/PBCH block could be delivered to the TRP implicitly. For example, the TRP could determine whether to schedule data transmission over one or more symbols or slots carrying the SS/PBCH block according to the reported channel quality (e.g. RSRP or BLER or CQI) of the current link including the currently serving Tx beam and Rx beam. If the reported channel quality is higher than or equal to the first threshold T1, then the TRP could transmit data over the symbols or slots carrying the SS/PBCH block. Otherwise the TRP will not transmit data over the symbols or slots carrying the SS/PBCH block.

Alternatively, whether the UE could measure on the SS/PBCH block with a different Rx beam may be totally up to the scheduling of the TRP. If the TRP schedules data transmission over the symbols or slots carrying the SS/PBCH block, then the UE may be not allowed to measure on the SS/PBCH block with a different Rx beam. If no data transmission is scheduled over the symbols or slots carrying the SS/PBCH block, then the UE could perform measurement on the SS/PBCH block with a different Rx beam.

In addition to the SS/PBCH block, a UE specific CSI-RS could be used as the BM-RS for downlink beam management. For downlink transmission, the beam management may include three procedures: P-1, P-2 and P-3. P-1 is to obtain the initial TRP Tx beam and UE Rx beam. P-2 is to enable the TRP Tx beam refinement and P-3 is to enable the UE Rx beam refinement.

When transmitting the CSI-RS for beam management, data transmission could be scheduled over the same symbols or slots carrying the CSI-RS, but there should be some restrictions. Similar to the SS/PBCH block as described above, if the UE needs to perform measurement on the CSI-RS with a different Rx beam, then the data transmission over one or more symbols or slots carrying the CSI-RS should be avoided. Furthermore, if the CSI-RS is transmitted on a sub-time unit smaller than one symbol, which means the Tx beam could change within one symbol, the data transmission should not be multiplexed on the same symbol with the CSI-RS.

For the P-1 procedure, if the UE finds a measured channel quality of a current link including a pair of currently serving Tx beam and Rx beam is higher than or equal to a first threshold T1, then the UE is not necessary to perform measurement to find different beams on a same antenna panel, which means the measurement interval could be prolonged. This means some measurement over periodic CSI-RSs could be ignored. Thus in some embodiments, when the measured channel quality of the current link is higher than or equal to the first threshold T1, the UE may suspend the measurement of the channel quality for a predefined time period and the TRP could transmit data on one or more symbols or slots carrying a P-1 CSI-RS. If the measured channel quality of the current link is lower than the first threshold T1 and higher than a second threshold T2, the UE may determine to measure on the CSI-RS with a different Rx beam and indicate the TRP not to schedule data transmission on one or more symbols carrying the CSI-RS.

According to some embodiments of the present disclosure, the UE may explicitly indicate the TRP not to schedule data transmission on one or more symbols carrying the CSI-RS, when the UE determines that it needs to measure on the CSI-RS with a different Rx beam so as to search a new link including the currently serving Tx beam and the different Rx beam. The indication could be transmitted to the TRP over PUCCH or PUSCH. After receiving the indication, the TRP will not schedule data transmission over the one or more symbols carrying the CSI-RS.

Alternatively, the indication about whether a different Rx beam should be used for measurement on the CSI-RS could be delivered to the TRP implicitly. For example, the TRP could determine whether to schedule data transmission over one or more symbols or slots carrying the CSI-RS according to the reported channel quality (e.g. RSRP or BLER or CQI) of the current link including the currently serving Tx beam and Rx beam. If the reported channel quality is higher than or equal to the first threshold T1, then the TRP could transmit data over the symbols or slots carrying the CSI-RS. Otherwise the TRP will not transmit data over the symbols or slots carrying the CSI-RS.

Alternatively, whether the UE could measure on the SS/PBCH block with a different Rx beam may be totally up to the scheduling of the TRP. If the TRP schedules data transmission over the symbols or slots carrying the SS/PBCH block, then the UE may be not allowed to measure on the SS/PBCH block with a different Rx beam. If no data transmission is scheduled over the symbols or slots carrying the SS/PBCH block, then the UE could perform measurement on the SS/PBCH block with a different Rx beam.

For the P-2 procedure, since the UE Rx beam is fixed, data could be transmitted together with a P-2 CSI-RS. But for the P-3 procedure, the data transmission together with a P-3 CSI-RS should be avoided since the P-3 procedure is to sweep the UE Rx beam for refinement.

In addition, it is noted that the first threshold T1 and the second threshold T2 can be configured independently for the SS/PBCH block and the CSI-RS by higher layer signaling or DCI. Alternatively, T1 and T2 can be common for the SS/PBCH block and the CSI-RS, and the ratio of Energy Per Resource Element (EPRE) between SSS or PBCH and CSI-RS should be configured by higher layer signaling or DCI.

As a further explanation, example procedures performed at the UE side and the TRP side will be briefly described below with reference FIG. 10 and FIG. 11.

Figure 10:
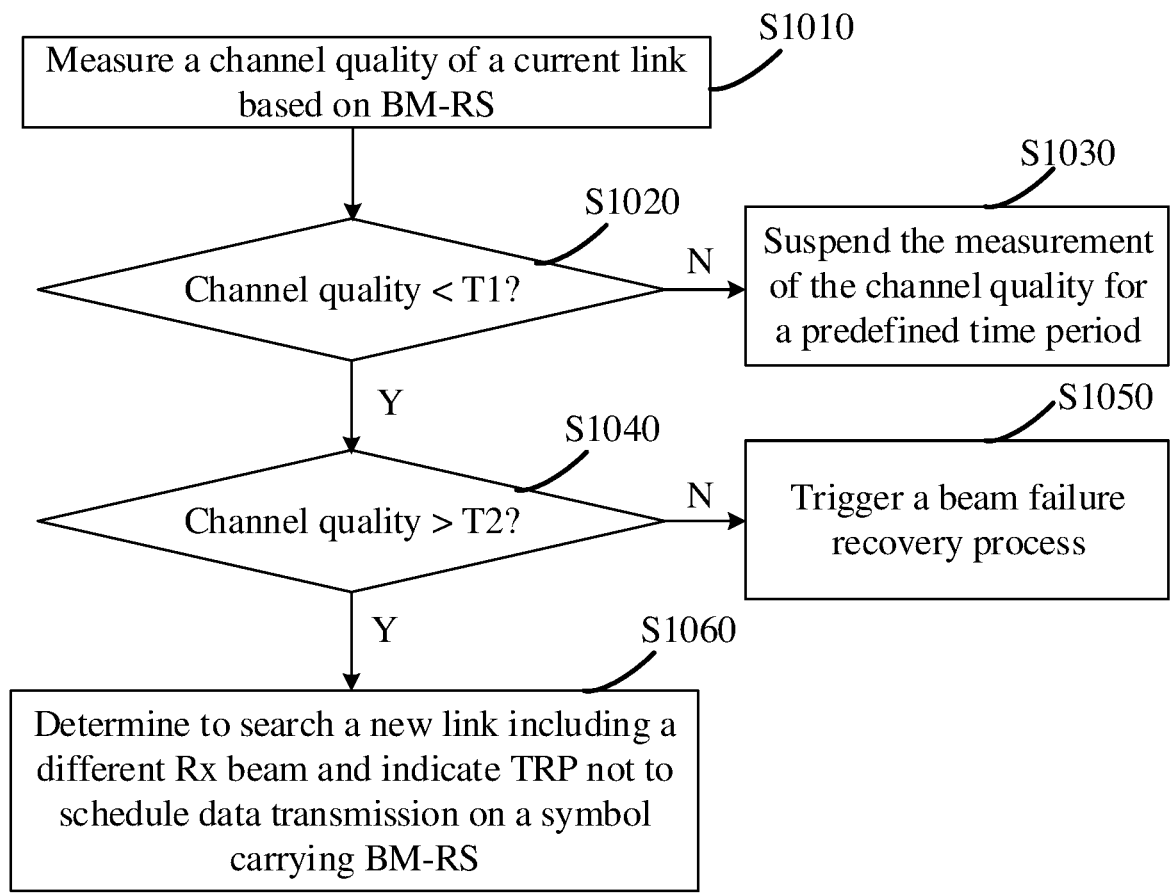
FIG. 10 shows a flow chart of an exemplary method performed at the UE in accordance with some embodiments of the present disclosure.
Figure 11:
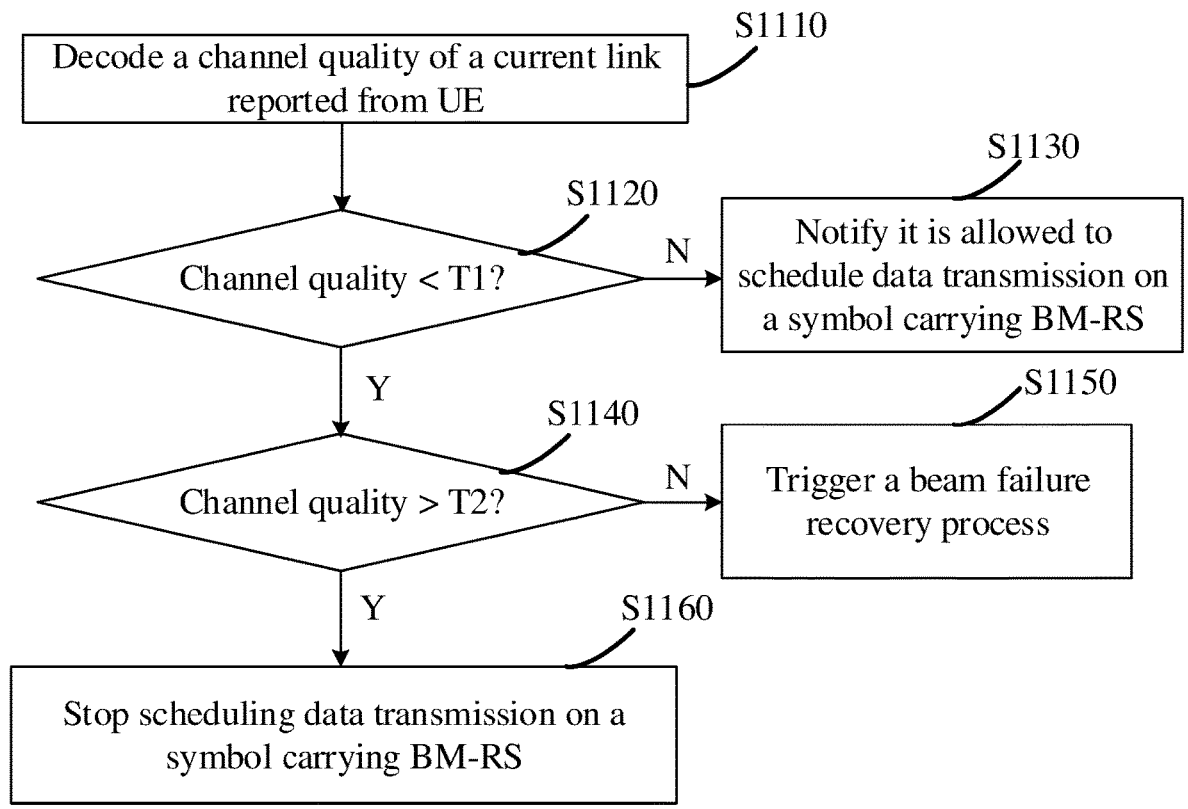
FIG. 11 shows a flow chart of an exemplary method performed at the UE in accordance with some embodiments of the present disclosure.

FIG. 10 shows a flow chart of an exemplary method performed at the UE according to some embodiments of the present disclosure, and FIG. 11 shows a flow chart of an exemplary method performed at the UE according to some embodiments of the present disclosure.

As shown in FIG. 10, at S1010, the UE may measure a channel quality of a current link including a currently serving Tx beam and a currently serving Rx beam based on the BM-RS. Then the UE may compare the measured channel quality with a first threshold T1 and a second threshold T2. If the measured channel quality is not lower than T1 at S1020, the UE may suspend the measurement of the channel quality for a predefined time period at S1030 so as to prolong the measurement interval as described before. If the measured channel quality is lower than T1 at S1020 and higher than T2 at S1040, the UE may determine to search a new link including a different Rx beam and indicate TRP not to schedule data transmission on a symbol carrying BM-RS at S1060. If the measured channel quality is not higher than T2 at S1040, the UE may trigger a beam failure recovery process to perform a new beam management procedure at S1050.

Alternatively, the UE may determine not to measure the channel quality of the new link including the currently serving Tx beam and the different Rx beam based on the BM-RS, in response to receiving schedule information from the TRP indicating that the TRP schedules data transmission over the symbol carrying the BM-RS.

Correspondingly, as shown in FIG. 11, at S1110, the TRP may decode the channel quality of the current link reported from the UE. Then the TRP may compare the measured channel quality with the first threshold T1 and the second threshold T2. If the decoded channel quality is not lower than T1 at S1120, the TRP may be notified that it is allowed to schedule data transmission on the symbol carrying the BM-RS. If the decoded channel quality is lower than T1 at S1120 and higher than T2 at S1140, the TRP may determine that the UE may need to search a new link including a different Rx beam and stop scheduling data transmission on the symbol carrying the BM-RS at S1160. If the decoded channel quality is not higher than T2 at S1140, the TRP may trigger a beam failure recovery process to perform a new beam management procedure at S1150.

Alternatively, the TRP may determine that the UE is to search the new link including the different Rx beam, in response to an indication from the UE indicating the UE is to search the new link. In addition, the TRP may notify the UE not to search the new link including the different Rx beam, when the TRP schedules data transmission over the symbol carrying the BM-RS.

With the proposed procedure for scheduling data transmission during beam management, it is possible to ensure that data transmission over one or more symbols carrying a BM-RS for beam measurement will not be scheduled when the Tx beam or the Rx beam for transmission changes.

Figure 12:
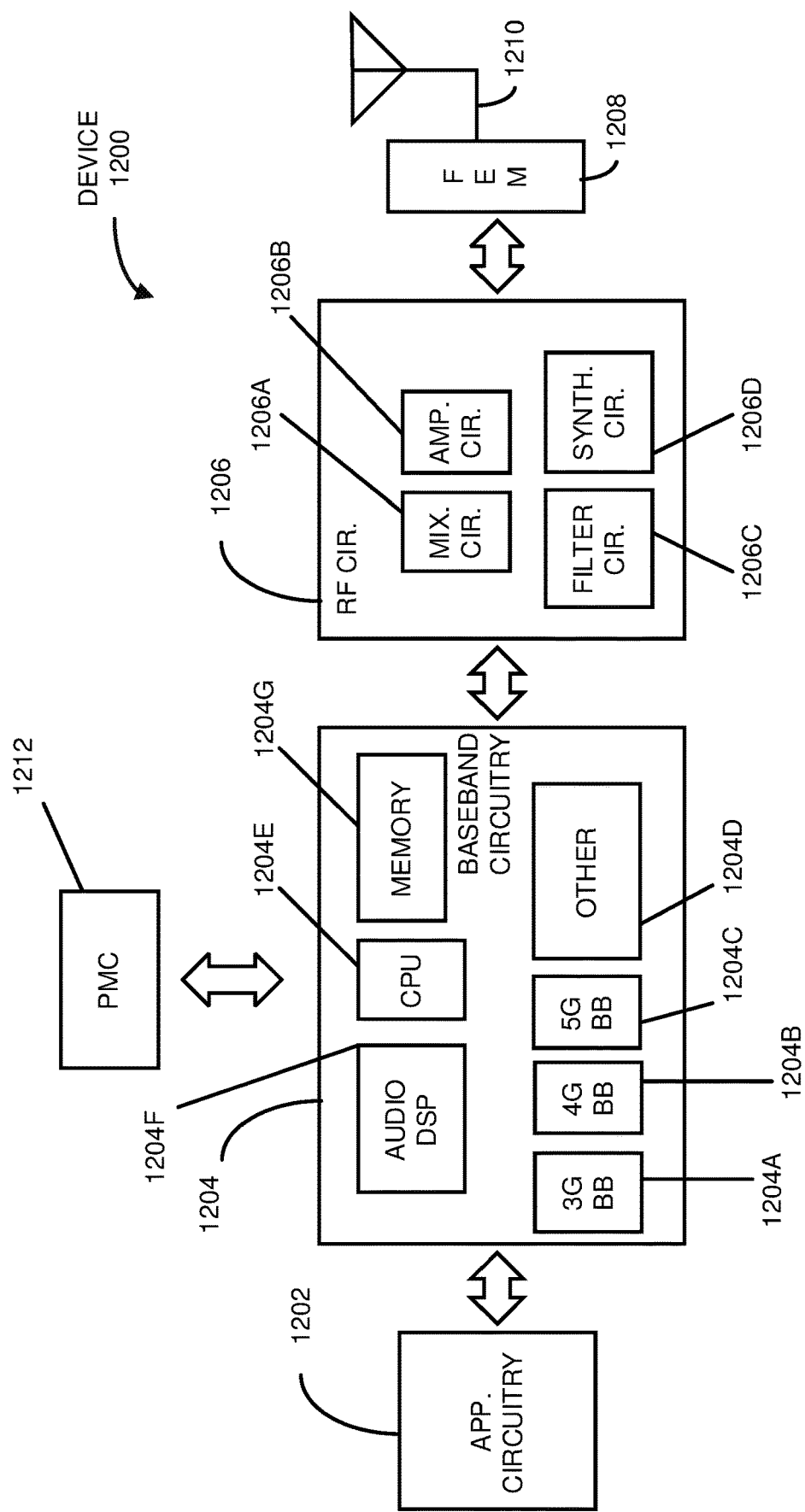
FIG. 12 illustrates example components of a device in accordance with some embodiments of the disclosure.

Embodiments described herein may be implemented into a device using any suitably configured hardware and/or software. FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a TRP. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc.

In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path.

In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature down-conversion and up-conversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct down-conversion and direct up-conversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 1202, RF circuitry 1206, or FEM 1208.

In some embodiments, the PMC 1212 may control, or otherwise be part of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it may transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
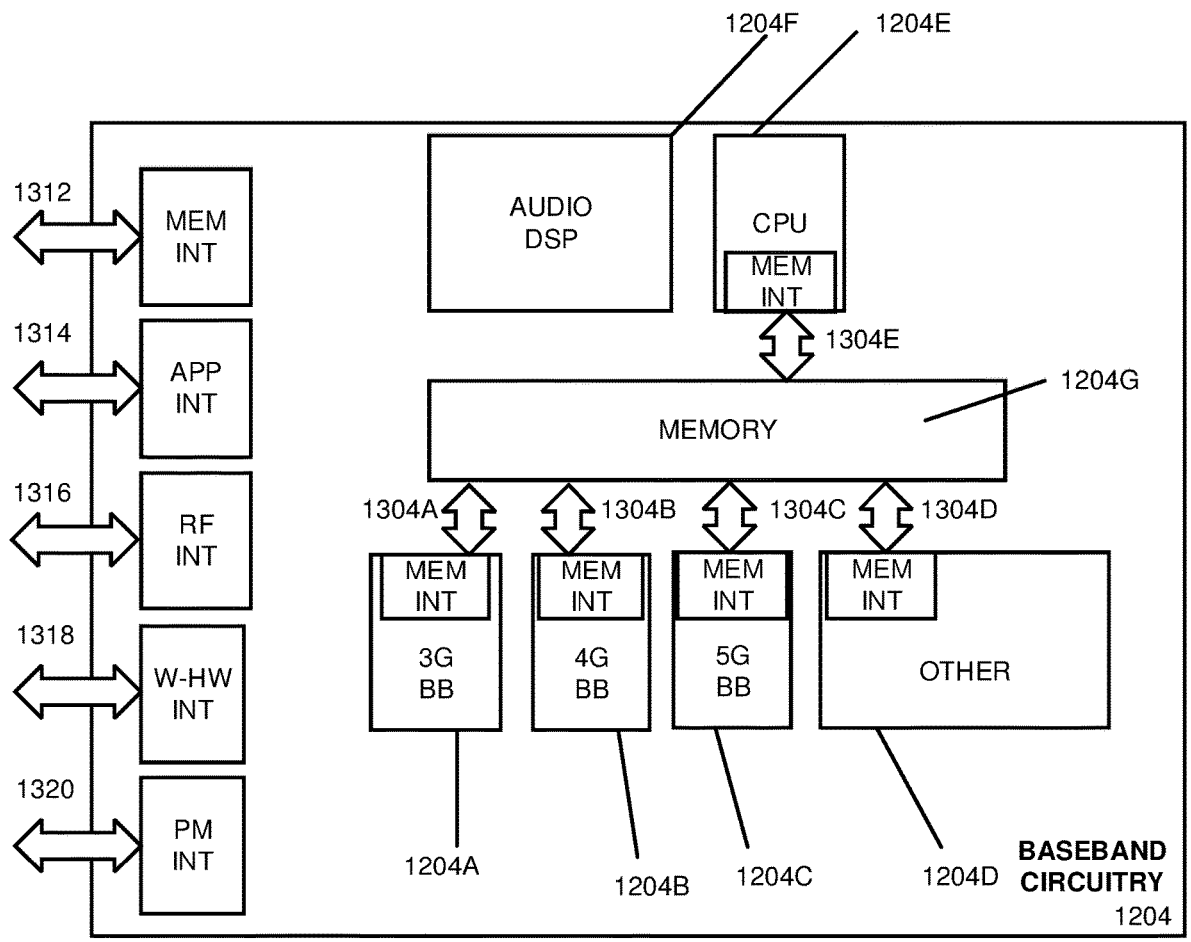
FIG. 13 illustrates example interfaces of baseband circuitry in accordance with some embodiments of the disclosure.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
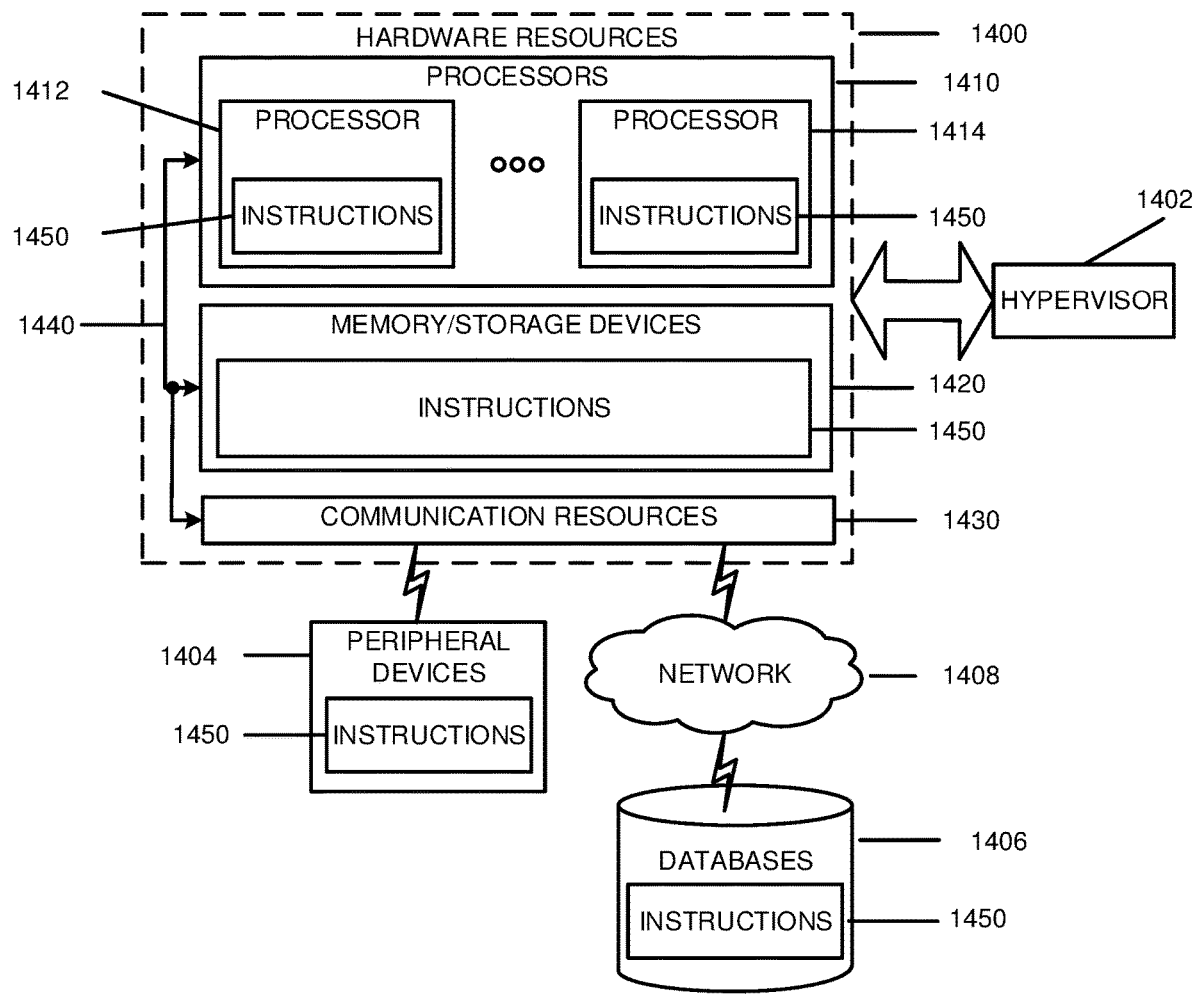
FIG. 14 is a block diagram illustrating components, according to some example embodiments of the disclosure, able to read instructions from a machine-readable or computer-readable medium and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Some non-limiting examples are provided below.

Example 1 includes an apparatus for User Equipment (UE), wherein the UE is configured with one or more antenna panels for receiving transmit (Tx) beams from a Transmission Reception Point (TRP) and the apparatus includes circuitry configured to: report a Tx beam matrix to the TRP, wherein each column of the Tx beam matrix includes Tx beam candidates that are determined based on beam measurement at the UE and observed by a respective antenna panel of the one or more antenna panels; and decode an indication received from the TRP to determine a group of selected Tx beams to be used by the TRP to communicate with the UE, wherein the indication includes a group index indicating the group of selected Tx beams among a number of groups of Tx beam candidates reconstructed by the TRP from the Tx beam matrix based on a predefined reconstruction rule known to both the TRP and the UE.

Example 2 includes the apparatus of example 1, wherein the Tx beam candidates in each column of the Tx beam matrix are sorted in a descending or ascending order of a metric of the beam measurement so that a first row or a last row of the Tx beam matrix includes best Tx beams observed by each antenna panel of the UE.

Example 3 includes the apparatus of example 2, wherein the indication includes a one-bit flag for indicating whether a combination of the best Tx beams in the first row or the last row of the Tx beam matrix are to be used by the TRP or not.

Example 4 includes the apparatus of example 3, wherein the circuitry is further configured to: determine the combination of the best Tx beams as the group of selected Tx beams, when the one-bit flag indicates that the combination of the best Tx beams are to be used by the TRP.

Example 5 includes the apparatus of example 1, wherein the Tx beam matrix includes a subset having a predefined size and construction known to both the TRP and the UE, and the indication includes a group index indicating the group of selected Tx beams among a number of groups of Tx beam candidates reconstructed by the TRP from the subset based on a predefined reconstruction rule known to both the TRP and the UE.

Example 6 includes the apparatus of example 1, wherein each row of the Tx beam matrix includes Tx beam candidates corresponding to a respective receive (Rx) beam set of one or more Rx beam sets specified by the UE.

Example 7 includes the apparatus of example 6, wherein the indication includes a row index indicating a respective row of Tx beam candidates among the Tx beam matrix as the group of selected Tx beams.

Example 8 includes the apparatus of example 6, wherein the Tx beam matrix includes a subset including a predefined number of rows of the Tx beam matrix, and the indication includes a row index indicating a respective row of Tx beam candidates among the subset as the group of selected Tx beams.

Example 9 includes the apparatus of example 6, wherein the indication includes a one-bit flag for indicating whether the TRP is to indicate the group of selected Tx beams based on a respective Rx beam set or not; and the indication includes a row index indicating a respective row of Tx beam candidates among the Tx beam matrix as the group of selected Tx beams, when the one-bit flag indicates that the TRP is to indicate the group of selected Tx beams based on the respective Rx beam set.

Example 10 includes the apparatus of any of examples 1-9, wherein for each of the Tx beam candidates, a combination of a Tx beam index or beam pair link index, a group index and a metric of the beam measurement corresponding to the Tx beam candidate are reported to the TRP.

Example 11 includes the apparatus of any of examples 1-9, wherein for all Tx beam candidates within a group, a group index is reported once to the TRP, and a combination of a Tx beam index or beam pair link index and a metric of the beam measurement corresponding to each Tx beam candidate are reported to the TRP.

Example 12 includes the apparatus of example 2, 10 or 11, wherein the metric of the beam measurement includes a Reference Signal Received Power (RSRP), a Block Error Ratio (BLER) or a Channel Quality Indicator (CQI) corresponding to a pair of currently measured Tx beam and Rx beam.

Example 13 includes the apparatus of example 1, wherein the circuitry is further configured to report the Tx beam matrix and decode the indication in response to an enabling signal configured through higher layer signaling or Downlink Control Information (DCI).

Example 14 includes an apparatus for a Transmission Reception Point (TRP) to communicate with UE, wherein the UE is configured with one or more antenna panels for receiving transmit (Tx) beams from the TRP and the apparatus includes circuitry configured to: decode a Tx beam matrix reported by the UE, wherein each column of the Tx beam matrix includes Tx beam candidates that are determined based on beam measurement at the UE and observed by a respective antenna panel of the one or more antenna panels; transmit an indication to the UE to indicate a group of selected Tx beams to be used by the TRP to communicate with the UE, wherein the indication includes a group index indicating the group of selected Tx beams among a number of groups of Tx beam candidates reconstructed by the TRP from the decoded Tx beam matrix based on a predefined reconstruction rule known to both the TRP and the UE.

Example 15 includes the apparatus of example 14, wherein the Tx beam candidates in each column of the Tx beam matrix are sorted in a descending or ascending order of a metric of the beam measurement so that a first row or a last row of the Tx beam matrix includes best Tx beams observed by each antenna panel of the UE.

Example 16 includes the apparatus of example 15, wherein the indication includes a one-bit flag for indicating whether a combination of the best Tx beams in the first row or the last row of the Tx beam matrix are to be used by the TRP or not.

Example 17 includes the apparatus of example 16, wherein the circuitry is further configured to: indicate the combination of the best Tx beams as the group of selected Tx beams, when the one-bit flag indicates that the combination of the best Tx beams are to be used by the TRP.

Example 18 includes the apparatus of example 14, wherein the Tx beam matrix includes a subset having a predefined size and construction known to both the TRP and the UE, and the indication includes a group index indicating the group of selected Tx beams among a number of groups of Tx beam candidates reconstructed by the TRP from the subset based on a predefined reconstruction rule known to both the TRP and the UE.

Example 19 includes the apparatus of example 14, wherein each row of the Tx beam matrix includes Tx beam candidates corresponding to a respective receiving (Rx) beam set of one or more Rx beam sets specified by the UE.

Example 20 includes the apparatus of example 19, wherein the indication includes a row index indicating a respective row of Tx beam candidates among the Tx beam matrix as the group of selected Tx beams.

Example 21 includes the apparatus of example 19, wherein the Tx beam matrix includes a subset including a predefined number of rows of the Tx beam matrix, and the indication includes a row index indicating a respective row of Tx beam candidates among the subset as the group of selected Tx beams.

Example 22 includes the apparatus of example 19, wherein the indication includes a one-bit flag for indicating whether the TRP is to indicate the group of selected Tx beams based on a respective Rx beam set or not; and the indication includes a row index indicating a respective row of Tx beam candidates among the Tx beam matrix as the group of selected Tx beams, when the one-bit flag indicates that the TRP is to indicate the group of selected Tx beams based on the respective Rx beam set.

Example 23 includes the apparatus of any of examples 14-22, wherein for each of the Tx beam candidates, a combination of a Tx beam index or beam pair link index, a group index and a metric of the beam measurement corresponding to the Tx beam candidate are reported to the TRP.

Example 24 includes the apparatus of any of examples 14-22, wherein for all Tx beam candidates within a group, a group index is reported once to the TRP, and a combination of a Tx beam index or beam pair link index and a metric of the beam measurement corresponding to each Tx beam candidate are reported to the TRP.

Example 25 includes the apparatus of example 15, 23 or 24, wherein the metric of the beam measurement includes a Reference Signal Received Power (RSRP), a Block Error Ratio (BLER) or a Channel Quality Indicator (CQI) corresponding to a pair of currently measured Tx beam and Rx beam.

Example 26 includes the apparatus of example 14, wherein the circuitry is further configured to decode the Tx beam matrix and transmit the indication in response to an enabling signal configured through higher layer signaling or Downlink Control Information (DCI).

Example 27 includes a method performed at User Equipment (UE), wherein the UE is configured with one or more antenna panels for receiving transmit (Tx) beams from a Transmission Reception Point (TRP) and the method includes: reporting a Tx beam matrix to the TRP, wherein each column of the Tx beam matrix includes Tx beam candidates that are determined based on beam measurement at the UE and observed by a respective antenna panel of the one or more antenna panels; and decoding an indication received from the TRP to determine a group of selected Tx beams to be used by the TRP to communicate with the UE, wherein the indication includes a group index indicating the group of selected Tx beams among a number of groups of Tx beam candidates reconstructed by the TRP from the Tx beam matrix based on a predefined reconstruction rule known to both the TRP and the UE.

Example 28 includes the method of example 27, wherein the Tx beam candidates in each column of the Tx beam matrix are sorted in a descending or ascending order of a metric of the beam measurement so that a first row or a last row of the Tx beam matrix includes best Tx beams observed by each antenna panel of the UE.

Example 29 includes the method of example 28, wherein the indication includes a one-bit flag for indicating whether a combination of the best Tx beams in the first row or the last row of the Tx beam matrix are to be used by the TRP or not.

Example 30 includes the method of example 29, further including: determining the combination of the best Tx beams as the group of selected Tx beams, when the one-bit flag indicates that the combination of the best Tx beams are to be used by the TRP.

Example 31 includes the method of example 27, wherein the Tx beam matrix includes a subset having a predefined size and construction known to both the TRP and the UE, and the indication includes a group index indicating the group of selected Tx beams among a number of groups of Tx beam candidates reconstructed by the TRP from the subset based on a predefined reconstruction rule known to both the TRP and the UE.

Example 32 includes the method of example 27, wherein each row of the Tx beam matrix includes Tx beam candidates corresponding to a respective receive (Rx) beam set of one or more Rx beam sets specified by the UE.

Example 33 includes the method of example 32, wherein the indication includes a row index indicating a respective row of Tx beam candidates among the Tx beam matrix as the group of selected Tx beams.

Example 34 includes the method of example 32, wherein the Tx beam matrix includes a subset including a predefined number of rows of the Tx beam matrix, and the indication includes a row index indicating a respective row of Tx beam candidates among the subset as the group of selected Tx beams.

Example 35 includes the method of example 32, wherein the indication includes a one-bit flag for indicating whether the TRP is to indicate the group of selected Tx beams based on a respective Rx beam set or not; and the indication includes a row index indicating a respective row of Tx beam candidates among the Tx beam matrix as the group of selected Tx beams, when the one-bit flag indicates that the TRP is to indicate the group of selected Tx beams based on the respective Rx beam set.

Example 36 includes the method of any of examples 27-35, wherein for each of the Tx beam candidates, a combination of a Tx beam index or beam pair link index, a group index and a metric of the beam measurement corresponding to the Tx beam candidate are reported to the TRP.

Example 37 includes the method of any of examples 27-35, wherein for all Tx beam candidates within a group, a group index is reported once to the TRP, and a combination of a Tx beam index or beam pair link index and a metric of the beam measurement corresponding to each Tx beam candidate are reported to the TRP.

Example 38 includes the method of example 28, 36 or 37, wherein the metric of the beam measurement includes a Reference Signal Received Power (RSRP), a Block Error Ratio (BLER) or a Channel Quality Indicator (CQI) corresponding to a pair of currently measured Tx beam and Rx beam.

Example 39 includes the method of example 27, further including reporting the Tx beam matrix and decoding the indication in response to an enabling signal configured through higher layer signaling or Downlink Control Information (DCI).

Example 40 includes a method performed at a Transmission Reception Point (TRP) for communicating with User Equipment (UE), wherein the UE is configured with one or more antenna panels for receiving transmit (Tx) beams from the TRP and the method includes: decoding a Tx beam matrix reported by the UE, wherein each column of the Tx beam matrix includes Tx beam candidates that are determined based on beam measurement at the UE and observed by a respective antenna panel of the one or more antenna panels; transmitting an indication to the UE to indicate a group of selected Tx beams to be used by the TRP to communicate with the UE, wherein the indication includes a group index indicating the group of selected Tx beams among a number of groups of Tx beam candidates reconstructed by the TRP from the decoded Tx beam matrix based on a predefined reconstruction rule known to both the TRP and the UE.

Example 41 includes the method of example 40, wherein the Tx beam candidates in each column of the Tx beam matrix are sorted in a descending or ascending order of a metric of the beam measurement so that a first row or a last row of the Tx beam matrix includes best Tx beams observed by each antenna panel of the UE.

Example 42 includes the method of example 41, wherein the indication includes a one-bit flag for indicating whether a combination of the best Tx beams in the first row or the last row of the Tx beam matrix are to be used by the TRP or not.

Example 43 includes the method of example 42, further including: indicating the combination of the best Tx beams as the group of selected Tx beams, when the one-bit flag indicates that the combination of the best Tx beams are to be used by the TRP.

Example 44 includes the method of example 40, wherein the Tx beam matrix includes a subset having a predefined size and construction known to both the TRP and the UE, and the indication includes a group index indicating the group of selected Tx beams among a number of groups of Tx beam candidates reconstructed by the TRP from the subset based on a predefined reconstruction rule known to both the TRP and the UE.

Example 45 includes the method of example 40, wherein each row of the Tx beam matrix includes Tx beam candidates corresponding to a respective receiving (Rx) beam set of one or more Rx beam sets specified by the UE.

Example 46 includes the method of example 45, wherein the indication includes a row index indicating a respective row of Tx beam candidates among the Tx beam matrix as the group of selected Tx beams.

Example 47 includes the method of example 45, wherein the Tx beam matrix includes a subset including a predefined number of rows of the Tx beam matrix, and the indication includes a row index indicating a respective row of Tx beam candidates among the subset as the group of selected Tx beams.

Example 48 includes the method of example 45, wherein the indication includes a one-bit flag for indicating whether the TRP is to indicate the group of selected Tx beams based on a respective Rx beam set or not; and the indication includes a row index indicating a respective row of Tx beam candidates among the Tx beam matrix as the group of selected Tx beams, when the one-bit flag indicates that the TRP is to indicate the group of selected Tx beams based on the respective Rx beam set.

Example 49 includes the method of any of examples 40-48, wherein for each of the Tx beam candidates, a combination of a Tx beam index or beam pair link index, a group index and a metric of the beam measurement corresponding to the Tx beam candidate are reported to the TRP.

Example 50 includes the method of example 40-48, wherein for all Tx beam candidates within a group, a group index is reported once to the TRP, and a combination of a Tx beam index or beam pair link index and a metric of the beam measurement corresponding to each Tx beam candidate are reported to the TRP.

Example 51 includes the method of example 41, 49 or 50, wherein the metric of the beam measurement includes a Reference Signal Received Power (RSRP), a Block Error Ratio (BLER) or a Channel Quality Indicator (CQI) corresponding to a pair of currently measured Tx beam and Rx beam.

Example 52 includes the method of example 40, further including: decoding the Tx beam matrix and transmitting the indication in response to an enabling signal configured through higher layer signaling or Downlink Control Information (DCI).

Example 53 includes a non-transitory computer-readable medium having instructions stored thereon, wherein the instructions, when executed by one or more processor(s) of User Equipment (UE) configured with one or more antenna panels for receiving transmit (Tx) beams from a Transmission Reception Point (TRP), cause the processor(s) to perform the method of any of examples 27-39.

Example 54 includes an apparatus for User Equipment (UE), wherein the UE is configured with one or more antenna panels for receiving transmit (Tx) beams from a Transmission Reception Point (TRP) and the apparatus includes means for performing the actions of the method of any of examples 27-39.

Example 55 includes a non-transitory computer-readable medium having instructions stored thereon, wherein the instructions, when executed by one or more processor(s) of a Transmission Reception Point (TRP) to communicate with User Equipment (UE) configured with one or more antenna panels for receiving transmit (Tx) beams from the TRP cause the processor(s) to perform the method of any of examples 40-52.

Example 56 includes an apparatus for a Transmission Reception Point (TRP) to communicate with User Equipment (UE), wherein the UE is configured with one or more antenna panels for receiving transmit (Tx) beams from the TRP and the apparatus includes means for performing the actions of the method of any of examples 40-52.

Example 57 includes an apparatus for User Equipment (UE) to communicate with a Transmission Reception Point (TRP), including circuitry configured to: determine whether to search a new link between the UE and the TRP by measuring a channel quality of the new link based on a beam management reference signal (BM-RS), wherein the new link includes a currently serving transmit (Tx) beam of the TRP and a new receive (Rx) beam different from a currently serving Rx beam of the UE; and indicate the TRP not to schedule data transmission on a symbol carrying the BM-RS, when determining to search the new link including the currently serving Tx beam and the new Rx beam.

Example 58 includes the apparatus of example 57, wherein the circuitry is further configured to: measure a channel quality of a current link including the currently serving Tx beam and the currently serving Rx beam based on the BM-RS.

Example 59 includes the apparatus of example 58, wherein the circuitry is further configured to: determine to search the new link including the currently serving Tx beam and the new Rx beam, when the measured channel quality of the current link is lower than a first threshold T1 and higher than a second threshold T2, where T1 and T2 is predefined by higher layer signaling and T1 is greater than T2.

Example 60 includes the apparatus of example 58, wherein the circuitry is further configured to: suspend the measurement of the channel quality for a predefined time period when the measured channel quality of the current link is higher than or equal to the first threshold T1.

Example 61 includes the apparatus of example 58, wherein the circuitry is further configured to: trigger a beam failure recovery process for the UE to perform a new beam management procedure when the measured channel quality of the current link is lower than or equal to the second threshold T2.

Example 62 includes the apparatus of any of examples 57 to 61, wherein the channel quality is characterized by a Reference Signal Received Power (RSRP), a Block Error Ratio (BLER) or a Channel Quality Indicator (CQI) as measured based on the BM-RS.

Example 63 includes the apparatus of example 57, wherein the BM-RS includes a synchronization signal block (SSB) that is broadcast by the TRP and includes a primary synchronization signal (PSS), a secondary synchronization signal (SSS) and a physical broadcasting channel (PBCH).

Example 64 includes the apparatus of example 57, wherein the BM-RS includes a UE specific channel state information reference signal (CSI-RS).

Example 65 includes the apparatus of example 64, wherein the circuitry is further configured to: indicate the TRP not to schedule data transmission on the symbol carrying the CSI-RS, when determining the CSI-RS is transmitted on a sub-time unit which is smaller than one symbol.

Example 66 includes the apparatus of example 57, wherein the circuitry is further configured to: determine not to measure the channel quality of the new link including the currently serving Tx beam and the new Rx beam based on the BM-RS, in response to receiving schedule information from the TRP indicating that the TRP schedules data transmission over the symbol carrying the BM-RS.

Example 67 includes an apparatus for a Transmission Reception Point (TRP) to communicate with User Equipment (UE), including circuitry configured to: determine whether the UE is to search a new link between the UE and the TRP by measuring a channel quality of the new link based on a beam management reference signal (BM-RS), wherein the new link includes a currently serving transmit (Tx) beam of the TRP and a new receive (Rx) beam different from a currently serving Rx beam of the UE; and stop the TRP from scheduling data transmission on a symbol carrying the BM-RS, when determining the UE is to search the new link including the currently serving Tx beam and the new Rx beam.

Example 68 includes the apparatus of example 67, wherein the circuitry is further configured to: decode a channel quality of a current link reported from the UE, wherein the current link includes the currently serving Tx beam and the currently serving Rx beam.

Example 69 includes the apparatus of example 68, wherein the circuitry is further configured to: determine the UE is to search the new link including the currently serving Tx beam and the new Rx beam, when the decoded channel quality of the current link is lower than a first threshold T1 and higher than a second threshold T2, where T1 and T2 is predefined by higher layer signaling and T1 is greater than T2.

Example 70 includes the apparatus of example 68, wherein the circuitry is further configured to: notify the TRP that it is allowed to schedule data transmission on the symbol carrying the BM-RS, when the measured channel quality of the current link is higher than or equal to the first threshold T1.

Example 71 includes the apparatus of example 68, wherein the circuitry is further configured to: trigger a beam failure recovery process to perform a new beam management procedure when the decoded channel quality of the current link is lower than or equal to the second threshold T2.

Example 72 includes the apparatus of any of examples 67 to 71, wherein the channel quality is characterized by a Reference Signal Received Power (RSRP), a Block Error Ratio (BLER) or a Channel Quality Indicator (CQI) as measured based on the BM-RS.

Example 73 includes the apparatus of example 67, wherein the BM-RS includes a synchronization signal block (SSB) that is broadcast by the TRP and includes a primary synchronization signal (PSS), a secondary synchronization signal (SSS) and a physical broadcasting channel (PBCH).

Example 74 includes the apparatus of example 67, wherein the BM-RS includes a UE specific channel state information reference signal (CSI-RS).

Example 75 includes the apparatus of example 74, wherein the circuitry is further configured to: stop the TRP from scheduling data transmission on the symbol carrying the CSI-RS, when determining the CSI-RS is transmitted on a sub-time unit which is smaller than one symbol.

Example 76 includes the apparatus of example 67, wherein the circuitry is further configured to: determine the UE is to search the new link including the currently serving Tx beam and the new Rx beam, in response to an indication from the UE indicating the UE is to search the new link.

Example 77 includes the apparatus of example 67, wherein the circuitry is further configured to: notify the UE not to search the new link including the currently serving Tx beam and the new Rx beam, when the TRP schedules data transmission over the symbol carrying the BM-RS.

Example 78 includes a method performed at User Equipment (UE) for communicating with a Transmission Reception Point (TRP), including: determining whether to search a new link between the UE and the TRP by measuring a channel quality of the new link based on a beam management reference signal (BM-RS), wherein the new link includes a currently serving transmit (Tx) beam of the TRP and a new receive (Rx) beam different from a currently serving Rx beam of the UE; and indicating the TRP not to schedule data transmission on a symbol carrying the BM-RS, when determining to search the new link including the currently serving Tx beam and the new Rx beam.

Example 79 includes the method of example 78, further including: measuring a channel quality of a current link including the currently serving Tx beam and the currently serving Rx beam based on the BM-RS.

Example 80 includes the method of example 79, further including: determining to search the new link including the currently serving Tx beam and the new Rx beam, when the measured channel quality of the current link is lower than a first threshold T1 and higher than a second threshold T2, where T1 and T2 is predefined by higher layer signaling and T1 is greater than T2.

Example 81 includes the method of example 79, further including: suspending the measurement of the channel quality for a predefined time period when the measured channel quality of the current link is higher than or equal to the first threshold T1.

Example 82 includes the method of example 79, further including: triggering a beam failure recovery process for the UE to perform a new beam management procedure when the measured channel quality of the current link is lower than or equal to the second threshold T2.

Example 83 includes the method of any of examples 78 to 82, wherein the channel quality is characterized by a Reference Signal Received Power (RSRP), a Block Error Ratio (BLER) or a Channel Quality Indicator (CQI) as measured based on the BM-RS.

Example 84 includes the method of example 78, wherein the BM-RS includes a synchronization signal block (SSB) that is broadcast by the TRP and includes a primary synchronization signal (PSS), a secondary synchronization signal (SSS) and a physical broadcasting channel (PBCH).

Example 85 includes the method of example 78, wherein the BM-RS includes a UE specific channel state information reference signal (CSI-RS).

Example 86 includes the method of example 85, further including: indicating the TRP not to schedule data transmission on the symbol carrying the CSI-RS, when determining the CSI-RS is transmitted on a sub-time unit which is smaller than one symbol.

Example 87 includes the method of example 78, further including: determining not to measure the channel quality of the new link including the currently serving Tx beam and the new Rx beam based on the BM-RS, in response to receiving schedule information from the TRP indicating that the TRP schedules data transmission over the symbol carrying the BM-RS.

Example 88 includes a method performed at a Transmission Reception Point (TRP) for communicating with User Equipment (UE), including: determining whether the UE is to search a new link between the UE and the TRP by measuring a channel quality of the new link based on a beam management reference signal (BM-RS), wherein the new link includes a currently serving transmit (Tx) beam of the TRP and a new receive (Rx) beam different from a currently serving Rx beam of the UE; and stopping the TRP from scheduling data transmission on a symbol carrying the BM-RS, when determining the UE is to search the new link including the currently serving Tx beam and the new Rx beam.

Example 89 includes the method of example 88, further including: decoding a channel quality of a current link reported from the UE, wherein the current link includes the currently serving Tx beam and the currently serving Rx beam.

Example 90 includes the method of example 89, further including: determining the UE is to search the new link including the currently serving Tx beam and the new Rx beam, when the decoded channel quality of the current link is lower than a first threshold T1 and higher than a second threshold T2, where T1 and T2 is predefined by higher layer signaling and T1 is greater than T2.

Example 91 includes the method of example 89, further including: notifying the TRP that it is allowed to schedule data transmission on the symbol carrying the BM-RS, when the measured channel quality of the current link is higher than or equal to the first threshold T1.

Example 92 includes the method of example 89, further including: triggering a beam failure recovery process to perform a new beam management procedure when the decoded channel quality of the current link is lower than or equal to the second threshold T2.

Example 93 includes the method of any of examples 88 to 92, wherein the channel quality is characterized by a Reference Signal Received Power (RSRP), a Block Error Ratio (BLER) or a Channel Quality Indicator (CQI) as measured based on the BM-RS.

Example 94 includes the method of example 88, wherein the BM-RS includes a synchronization signal block (SSB) that is broadcast by the TRP and includes a primary synchronization signal (PSS), a secondary synchronization signal (SSS) and a physical broadcasting channel (PBCH).

Example 95 includes the method of example 88, wherein the BM-RS includes a UE specific channel state information reference signal (CSI-RS).

Example 96 includes the method of example 95, further including: stopping the TRP from scheduling data transmission on the symbol carrying the CSI-RS, when determining the CSI-RS is transmitted on a sub-time unit which is smaller than one symbol.

Example 97 includes the method of example 88, further including: determining the UE is to search the new link including the currently serving Tx beam and the new Rx beam, in response to an indication from the UE indicating the UE is to search the new link.

Example 98 includes the method of example 88, further including: notifying the UE not to search the new link including the currently serving Tx beam and the new Rx beam, when the TRP schedules data transmission over the symbol carrying the BM-RS.

Example 99 includes a non-transitory computer-readable medium having instructions stored thereon, wherein the instructions, when executed by one or more processor(s) of User Equipment (UE) to communicate with a Transmission Reception Point (TRP), cause the processor(s) to perform the method of any of examples 78-87.

Example 100 includes an apparatus for User Equipment (UE) to communicate with a Transmission Reception Point (TRP), including means for performing the actions of the method of any of examples 78-87.

Example 101 includes a non-transitory computer-readable medium having instructions stored thereon, wherein the instructions, when executed by one or more processor(s) of a Transmission Reception Point (TRP) to communicate with User Equipment (UE), cause the processor(s) to perform the method of any of examples 88-98.

Example 102 includes an apparatus for a Transmission Reception Point (TRP) to communicate with User Equipment (UE), including means for performing the actions of the method of any of examples 88-98.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. An apparatus for User Equipment (UE), the apparatus comprising one or more processors configured to:
report a transmit (Tx) beam matrix to an access node that is configured to generate a plurality of Tx beams, wherein the Tx beam matrix comprises two or more groups of Tx beam candidates that are determined based on beam measurement at the UE; and
decode an indication received from the access node to determine at least one group of Tx beams selected from the two or more groups of Tx beam candidates to be used by the access node to communicate with the UE.

2. The apparatus of claim 1, wherein the Tx beam candidates are sorted in a descending or ascending order of a metric of the beam measurement so that a first row or a last row of the Tx beam matrix comprises best Tx beams observed by each antenna panel of the UE.

3. The apparatus of claim 2, wherein the indication comprises a one-bit flag for indicating whether a combination of the best Tx beams in the first row or the last row of the Tx beam matrix are to be used by the access node or not.

4. The apparatus of claim 3, wherein the one or more processors are further configured to:
determine the combination of the best Tx beams as the at least one group of selected Tx beams, when the one-bit flag indicates that the combination of the best Tx beams are to be used by the access node.

5. The apparatus of claim 1, wherein the Tx beam matrix comprises a subset having a predefined size and construction known to both the access node and the UE, and the indication comprises a group index indicating the at least one group of selected Tx beams among a number of groups of Tx beam candidates reconstructed by the access node from the subset based on a predefined reconstruction rule.

6. The apparatus of claim 1, wherein each row of the Tx beam matrix comprises Tx beam candidates corresponding to a respective receive (Rx) beam set of one or more Rx beam sets specified by the UE.

7. The apparatus of claim 6, wherein the indication comprises a row index indicating a respective row of Tx beam candidates among the Tx beam matrix as the at least one group of selected Tx beams.

8. The apparatus of claim 6, wherein the Tx beam matrix comprises a subset including a predefined number of rows of the Tx beam matrix, and the indication comprises a row index indicating a respective row of Tx beam candidates among the subset as the at least one group of selected Tx beams.

9. The apparatus of claim 6, wherein the indication comprises a one-bit flag for indicating whether the access node is to indicate the at least one group of selected Tx beams based on a respective Rx beam set or not; and the indication comprises a row index indicating a respective row of Tx beam candidates among the Tx beam matrix as the at least one group of selected Tx beams, when the one-bit flag indicates that the access node is to indicate the at least one group of selected Tx beams based on the respective Rx beam set.

10. The apparatus of claim 1, wherein for each of the Tx beam candidates, at least one of a Tx beam index or beam pair link index, a group index, or a metric of the beam measurement corresponding to the Tx beam candidate are reported to the access node.

11. The apparatus of claim 1, wherein for all Tx beam candidates within a group, a group index is reported once to the access node, and at least one of a Tx beam index or beam pair link index, or a metric of the beam measurement corresponding to each Tx beam candidate are reported to the access node.

12. The apparatus of claim 1, wherein the one or more processors are further configured to report the Tx beam matrix and decode the indication in response to an enabling signal configured through higher layer signaling or Downlink Control Information (DCI).

13. The apparatus of claim 1, wherein the indication comprises a group index indicating the at least one group of selected Tx beams from among the two or more groups of Tx beam candidates.

14. An apparatus for an access node, the apparatus comprising one or more processors configured to:
decode a transmit (Tx) beam matrix reported by a user equipment (UE) configured to receive Tx beams from the access node, wherein the Tx beam matrix comprises two or more groups of Tx beam candidates that are determined based on beam measurement at the UE; and
transmit an indication to the UE to indicate at least one group of Tx beams selected from the two or more groups of Tx beam candidates to be used by the access node to communicate with the UE.

15. The apparatus of claim 14, wherein the Tx beam candidates are sorted in a descending or ascending order of a metric of the beam measurement so that a first row or a last row of the Tx beam matrix comprises best Tx beams observed by each antenna panel of the UE.

16. The apparatus of claim 15, wherein the indication comprises a one-bit flag for indicating whether a combination of the best Tx beams in the first row or the last row of the Tx beam matrix are to be used by the access node or not.

17. The apparatus of claim 16, wherein the one or more processors are further configured to:
indicate the combination of the best Tx beams as the at least one group of selected Tx beams, when the one-bit flag indicates that the combination of the best Tx beams are to be used by the access node.

18. The apparatus of claim 14, wherein the Tx beam matrix comprises a subset having a predefined size and construction known to both the access node and the UE, and the indication comprises a group index indicating the at least one group of selected Tx beams among a number of groups of Tx beam candidates reconstructed by the access node from the subset based on a predefined reconstruction rule.

19. The apparatus of claim 14, wherein each row of the Tx beam matrix comprises Tx beam candidates corresponding to a respective receiving (Rx) beam set of one or more Rx beam sets specified by the UE.

20. The apparatus of claim 19, wherein the indication comprises a row index indicating a respective row of Tx beam candidates among the Tx beam matrix as the at least one group of selected Tx beams.

21. The apparatus of claim 19, wherein the Tx beam matrix comprises a subset including a predefined number of rows of the Tx beam matrix, and the indication comprises a row index indicating a respective row of Tx beam candidates among the subset as the at least one group of selected Tx beams.

22. The apparatus of claim 19, wherein the indication comprises a one-bit flag for indicating whether the access node is to indicate the at least one group of selected Tx beams based on a respective Rx beam set or not; and the indication comprises a row index indicating a respective row of Tx beam candidates among the Tx beam matrix as the at least one group of selected Tx beams, when the one-bit flag indicates that the access node is to indicate the at least one group of selected Tx beams based on the respective Rx beam set.

* * * * *

UNITED STATES PATENT AND TRADEMARK OFFICE
CERTIFICATE OF CORRECTION

PATENT NO. : 11,728,868 B2
APPLICATION NO. : 16/637181
DATED : August 15, 2023
INVENTOR(S) : Guotong Wang, Yushu Zhang and Alexei Davydov It is certified that error appears in the above-identified patent and that said Letters Patent is hereby corrected as shown below:

On the Title Page

Item (56) (Other Publications), Line 6, After "Ericsson" delete ""Onbeam" and insert --"On beam--.

Signed and Sealed this
Twentieth Day of February, 2024

Katherine Kelly Vidal
*Director of the United States Patent and Trademark Office*